US012431316B2

(12) United States Patent
Fujii et al.

(10) Patent No.: US 12,431,316 B2
(45) Date of Patent: Sep. 30, 2025

(54) KLYSTRON DEVICE

(71) Applicant: CANON ELECTRON TUBES & DEVICES CO., LTD., Otawara (JP)

(72) Inventors: Satoshi Fujii, Utsunomiya (JP); Yoshihisa Okubo, Otawara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 121 days.

(21) Appl. No.: 18/467,832

(22) Filed: Sep. 15, 2023

(65) Prior Publication Data

US 2024/0006143 A1 Jan. 4, 2024

Related U.S. Application Data

(63) Continuation of application No. PCT/JP2022/011397, filed on Mar. 14, 2022.

(30) Foreign Application Priority Data

Mar. 17, 2021 (JP) ................................ 2021-043792
Nov. 1, 2021 (JP) ................................ 2021-178944

(51) Int. Cl.
*H01J 25/12* (2006.01)
*H01J 25/11* (2006.01)
*H01J 25/20* (2006.01)

(52) U.S. Cl.
CPC ............... *H01J 25/12* (2013.01); *H01J 25/11* (2013.01); *H01J 25/20* (2013.01)

(58) Field of Classification Search
None
See application file for complete search history.

(56) References Cited

U.S. PATENT DOCUMENTS 3,502,934 A 3/1970 Friedlander et al.
4,733,131 A * 3/1988 Tran ........................ H01J 25/10 315/5
5,838,107 A 11/1998 Beunas et al.
(Continued)

FOREIGN PATENT DOCUMENTS

JP 4-259736 A 9/1992
JP 2008-147027 A 6/2008
(Continued)

OTHER PUBLICATIONS

International Search Report issued Apr. 19, 2022 in PCT/JP2022/011397 filed on Mar. 14, 2022, 2 pages.
(Continued)

*Primary Examiner* — Kenneth B Wells
(74) *Attorney, Agent, or Firm* — Oblon, McClelland, Maier & Neustadt, L.L.P.

(57) ABSTRACT

According to one embodiment, a klystron device includes a klystron body and a focusing magnetic field device. The klystron body has an electron gun section, a collector section, a plurality of cavity resonators, and a plurality of drift tubes. The cavity resonators have nose sections that face each other in an axial direction and form a gap section that is connected to the drift tubes. At least one of the cavity resonators has an electric field correction section in a part of the nose section that makes a space of the gap section different with respect to a space between the nose sections.

11 Claims, 22 Drawing Sheets

(56) References Cited

U.S. PATENT DOCUMENTS

| | | | | |
|---|---|---|---|---|
| 6,486,605 | B1 * | 11/2002 | Beunas | H01J 23/09 315/5 |
| 7,116,051 | B2 * | 10/2006 | Vancil | H01J 25/14 315/5 |
| 7,446,478 | B2 * | 11/2008 | Syratchev | H01J 25/10 315/5.41 |
| 8,547,006 | B1 * | 10/2013 | Ives | H01J 25/10 313/446 |
| 8,847,489 | B2 * | 9/2014 | Teryaev | H01J 25/10 315/5.39 |
| 8,994,297 | B2 * | 3/2015 | Teryaev | H01J 25/10 315/501 |

FOREIGN PATENT DOCUMENTS

| | | | |
|---|---|---|---|
| JP | 4653649 | B2 | 3/2011 |
| JP | 2018-106977 | A | 7/2018 |
| RU | 2 747 579 | C2 | 5/2021 |

OTHER PUBLICATIONS

Partial Supplementary European Search Report issued Feb. 4, 2025 in European Patent Application No. 22771394.8, 14 pages.

Extended European Search Report issued Jun. 13, 2025, in corresponding European Patent Application No. 22771394.8, citing documents 1, 15, and 16 therein, 16 pages.

* cited by examiner

| | Center | Circum-ferential side | Radial side | Inter-mediate | Deviation between circumferential side and radial side |
|---|---|---|---|---|---|
| Comparative Example 2 | 1.00 | 1.62 | 1.23 | 1.41 | 31% |
| Fifth embodiment | 1.00 | 1.47 | 1.35 | 1.44 | 9% |

| | Center | Circum-ferential side | Radial side | Inter-mediate | Deviation between circumferential side and radial side |
|---|---|---|---|---|---|
| Comparative Example 3 | 1.00 | 1.44 | 1.15 | 1.29 | 25% |
| Sixth embodiment | 1.00 | 1.31 | 1.26 | 1.33 | 6% |

| | Center | Circum-ferential side | Radial side | Inter-mediate | Deviation between circumferential side and radial side |
|---|---|---|---|---|---|
| Comparative Example 2 | 1.00 | 1.62 | 1.23 | 1.41 | 31% |
| Comparative Example 4 | 1.00 | 1.59 | 1.26 | 1.42 | 27% |

| | Center | Circum-ferential side | Radial side | Inter-mediate | Deviation between circumferential side and radial side |
|---|---|---|---|---|---|
| Comparative Example 5 | 1.00 | 1.13 | 1.06 | 1.09 | 6% |
| Comparative Example 6 | 1.00 | 1.12 | 1.07 | 1.09 | 5% |

KLYSTRON DEVICE

CROSS-REFERENCE TO RELATED APPLICATIONS

This application is a Continuation Applications of PCT Application No. PCT/JP2022/011397, filed Mar. 14, 2022 and based upon and claiming the benefit of priority from Japanese Patent Applications No. 2021-043792, filed Mar. 17, 2021; and No. 2021-178944, filed Nov. 1, 2021, the entire contents of all of which are incorporated herein by reference.

FIELD

Embodiments described herein relate generally to a klystron device that amplifies high frequencies.

BACKGROUND

A multi-beam klystron, which is a klystron device, comprises a plurality of klystron bodies having an electron gun section that generates an electron beam, a collector section that captures the electron beam, a plurality of cavity resonators positioned between the electron gun section and the collector section, and a plurality of drift tubes that axially connect the plurality of cavity resonators and a focusing magnetic field device to focus the electron beam. The plurality of cavity resonators configure an input cavity for inputting high frequencies, a plurality of intermediate cavities, and an output cavity for outputting amplified high frequencies.

An electron beam from the electron gun section enters the input cavity, electrons are accelerated and decelerated by the phase of high frequency input to the input cavity so that velocity is modulated, density modulation occurs, in which accelerated electrons and decelerated electrons gather while electrons are traveling in a uniform electric field, so that electrons are clustered, the clustered electrons are gradually intensified by self-induced high-frequency electric fields in the plurality of intermediate cavities, a strong alternating electric field is induced when the clustered electrons pass through the output cavity, and an amplified high-power high frequency is output from the output cavity to the outside.

In such a klystron device, in a case where the electron beam is in a region where electric field intensity distribution changes little, electrons are accelerated and decelerated by a substantially uniform electric field; however, in a case where the electron beam comes to a region where electric field intensity distribution changes greatly, since the electric field that accelerates and decelerates the electrons is not axisymmetric with respect to the electron beam axis, the clustered electrons become non-axisymmetric, which leads to fluctuations in the electron beam orbit and a decrease in operating efficiency, resulting in a decrease in output conversion efficiency.

Alternatively, in such a klystron device, in a case where cavity resonator voltages in a radial direction and a circumferential direction in the cavity resonator are substantially equal, the electrons are accelerated and decelerated by substantially uniform cavity resonator voltages; however, in a case where the cavity resonator voltages in the radial direction and the circumferential direction in the cavity resonator are unequal, since the cavity resonator voltage that accelerates and decelerates the electrons is not axisymmetric with respect to the electron beam axis, energy dispersion within the clustered electron beam increases, which leads to fluctuations in the electron beam orbit and a decrease in operating efficiency, resulting in a decrease in output conversion efficiency.

DETAILED DESCRIPTION

In general, according to one embodiment, there is provided a klystron device comprising: a klystron body having an electron gun section that generates an electron beam, a collector section that captures the electron beam, a plurality of cavity resonators arranged between the electron gun section and the collector section, and a plurality of drift tubes that connect the plurality of cavity resonators in an axial direction; and a focusing magnetic field device to focus the electron beam. The cavity resonators have nose sections that face each other in the axial direction and form a gap section that is connected to the drift tubes. At least one of the cavity resonators has an electric field correction section in a part of the nose section that makes a space of the gap section different with respect to a space between the nose sections. The electric field correction section protrudes from the nose section in a radial direction of the cavity resonator and reduces the space of the gap section, is recessed from the nose section in a circumferential direction of the cavity resonator and increases the space of the gap section, or protrudes from the nose section in the radial direction of the cavity resonator to reduce the space of the gap section, and is recessed from the nose section in the circumferential direction of the cavity resonator to increase the space of the gap section.

According to another embodiment, there is provided a klystron device comprising: a klystron body having an electron gun section that generates an electron beam, a collector section that captures the electron beam, a plurality of cavity resonators arranged between the electron gun section and the collector section, and a plurality of drift tubes that connect the plurality of cavity resonators in an axial direction; and a focusing magnetic field device to focus the electron beam. The cavity resonators have nose sections that face each other in the axial direction and form a gap section that is connected to the drift tubes. At least one of the cavity resonators has a cavity resonator voltage correction section that is provided at a position of the nose section corresponding to a circumferential direction of the cavity resonator and that increases a space of the gap section.

A first embodiment will be described below with reference to FIG. 1 to FIG. 5.

Figure 1:
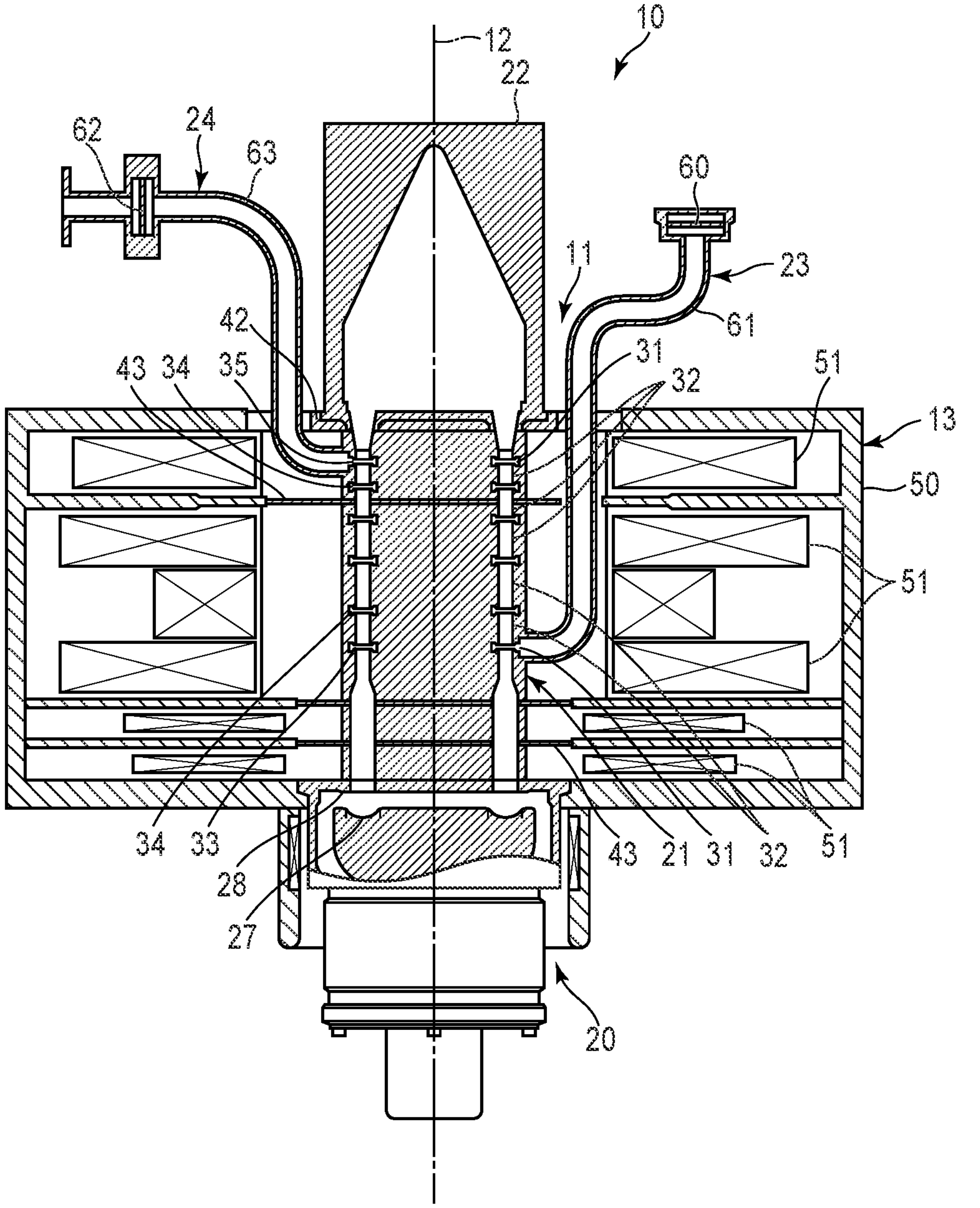
FIG. 1 is a cross-sectional view of a klystron device shown in a first embodiment.

FIG. 1 shows an example of a multi-beam klystron 10 as a klystron device.

The multi-beam klystron 10 comprises a klystron body 11 and a focusing magnetic field device 13 that is arranged around a central axis 12, which is a tube axis of the klystron body 11.

The klystron body 11 comprises an electron gun section 20, an interaction section 21, a collector section 22, and an input circuit section 23 and an output circuit section 24 connected to the interaction section 21.

The electron gun section 20 comprises a plurality of cathodes 27 and a plurality of anodes 28 facing these cathodes 27, respectively. The plurality of cathodes 27 and the plurality of anodes 28 are arranged at equal intervals on the same circumference of a predetermined radius from the central axis 12 of the klystron body 11, and generate a plurality of electron beams directed in the axial direction.

The interaction section 21 comprises a plurality of cavity resonators 31 arranged along the axial direction between the electron gun section 20 and the collector section 22, and a plurality of drift tubes (drift holes) 32 that connect the plurality of cavity resonators 31 in the axial direction. The cavity resonators 31 are a coaxial cylindrical TMmn0 mode (m≥0, n≥1), and, in the present embodiment, a coaxial cylindrical TM010 mode is used. That is, the plurality of drift tubes 32 communicating with the cavity resonators 31 face each other on the central axis of the plurality of cathodes 27 of the electron gun section 20, and are provided in a row at equal intervals on the same circumference of a predetermined radius from the central axis 12 of the klystron body 11, through which electron beams from the cathodes 27 pass, respectively.

The plurality of cavity resonators 31 each configure, in order from the electron gun section 20 to the collector section 22, an input cavity 33 into which a high frequency is input from the input circuit section 23, a plurality of intermediate cavities 34, and an output cavity 35 that outputs an amplified high frequency to the output circuit section 24.

Figure 2A:
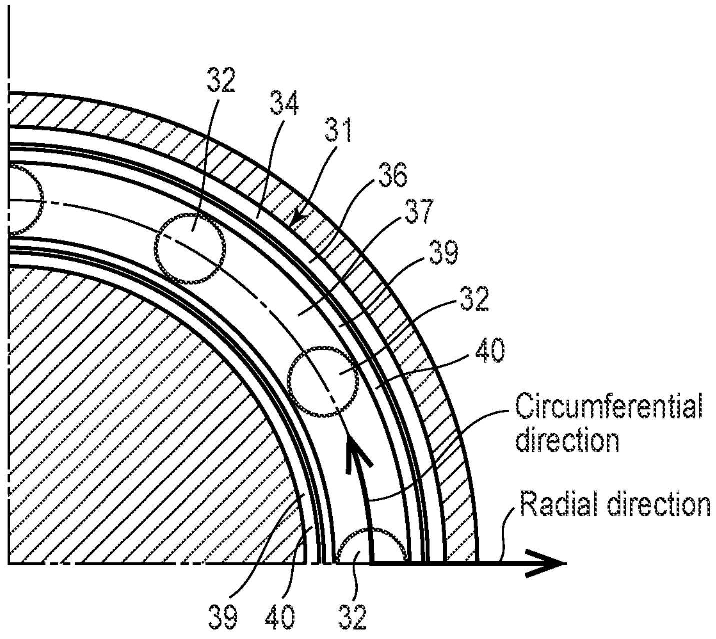
FIG. 2A shows a cavity resonator of the above klystron device and is a cross-sectional view in a direction intersecting an axial direction.
Figure 2B:
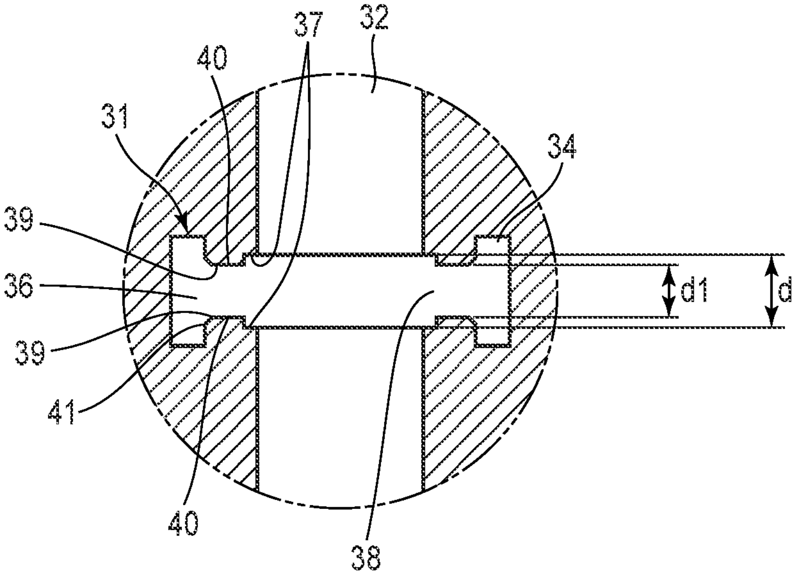
FIG. 2B shows the cavity resonator of the above klystron device and is an enlarged cross-sectional view in the axial direction.
Figure 3:
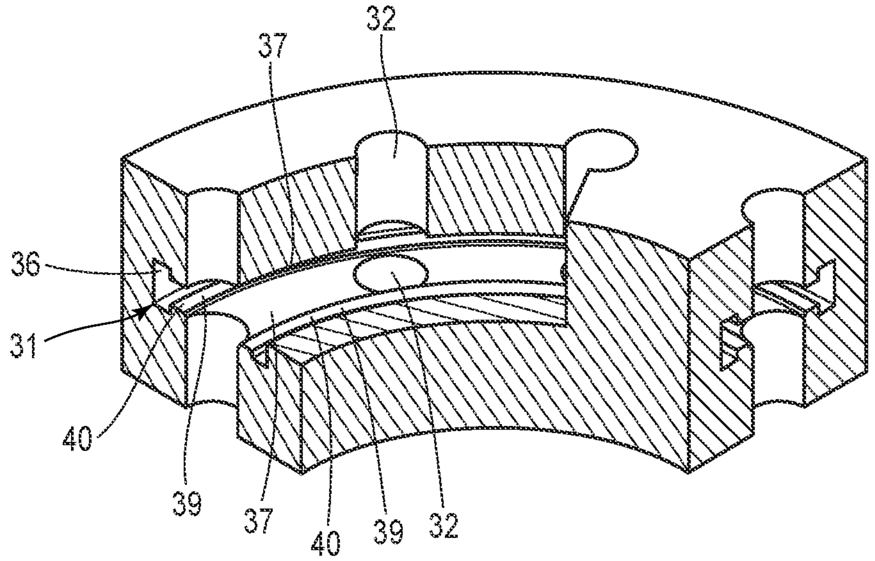
FIG. 3 is a perspective view of a part of the above cavity resonator.

As shown in FIG. 1 to FIG. 3, the cavity resonator 31 has a cylindrical or annular cavity 36 centered on the central axis 12. Nose sections 37 protrude from the inner surfaces of the cavity 36 facing each other in the axial direction, and the plurality of drift tubes 32 are communicated with this nose section 37. The nose section 37 protrudes annularly along the circumferential direction of the cavity 36 at a center position in the radial direction of the cavity 36. A gap section 38 with a predetermined space d communicating with the drift tube 32 is formed between the nose sections 37 facing each other in the axial direction.

The nose sections 37 facing each other in the axial direction are provided with an electric field correction section 39 for correcting the electric field intensity. The electric field correction section 39 is configured by a projection 40 each protruding from positions on both an inner diameter side and an outer diameter side of the nose section 37, which are positions on both sides of the radial direction centered on the drift tube 32. The electric field correction section 39 is annularly protruded along the circumferential direction of the nose section 37 at a position on the surface of the nose section 37 and away from the position of the drift tube 32. An inclined surface 41 is formed on the side surface of the projection 40 opposite the drift tube 32 and facing into the cavity 36. The gap section 38 between the projections 40 of the electric field correction sections 39 facing each other in the axial direction has a narrower space d1 than the space d between the nose sections 37, and configures a radial electric field correction gap section.

Furthermore, around the klystron body 11, a plurality of magnetic elements 43 for forming a plurality of magnetic field sections are arranged between the anode 28 and a collector pole piece 42 on the collector section 22 side.

The focusing magnetic field device 13 generates a magnetic field for focusing the electron beam and is configured by an electromagnet, for example. The focusing magnetic field device 13 has a magnetic housing 50 for forming a plurality of magnetic field sections together with the plurality of magnetic elements 43 of the klystron body 11, and a plurality of coils 51 arranged for each magnetic field section.

The focusing magnetic field device 13 generates a magnetic field parallel to the tube axis of the klystron body 11 at different magnetic field intensities in each magnetic field section. Two magnetic field sections are provided between the anode 28 and the input cavity 33 of the klystron body 11. These two magnetic field sections are matching sections to focus electron beams from the cathodes 27 and to make the electron beams parallel to the tube axis of the klystron body 11 beyond the input cavity 33.

The electron beam that has become a desired diameter by the matching section then enters the input cavity 33. Electrons are accelerated and decelerated by the phase of the high frequency input to the input cavity 33, and are velocity-modulated. While the electrons are traveling through a uniform electric field, a density modulation is generated in which the accelerated electrons and the decelerated electrons gather, respectively, resulting in clustering of electrons. The clustered electrons are gradually intensified by a self-induced high-frequency electric field in the plurality of intermediate cavities 34. When the clustered electrons pass through the output cavity 35, a strong alternating electric field is induced, and an amplified high-power high frequency is output from the output cavity 35 to the outside.

The input circuit section 23 comprises an input window 60 that inputs high frequencies from the outside and an input waveguide 61 that leads the high frequencies input through the input window 60 to the input cavity 33.

The output circuit section 24 comprises an output window 62 that outputs amplified high frequencies to the outside and an output waveguide 63 that leads the high frequencies to be output from the output cavity 35 to the output window 62.

By the way, in general, in a multi-beam klystron, by using a plurality of cathodes and a plurality of drift tubes, while keeping the ratio of the beam current to the beam voltage, referred to as perveance per single electron beam, low, the value of the total perveance can be made large. It is generally known in the art that the output conversion efficiency of a multi-beam klystron is higher when the perveance per single electron beam is smaller. The multi-beam klystron design can achieve lower voltage and higher efficiency operation than a single-beam klystron design.

For example, in a multi-beam klystron with a peak output exceeding megawatts, there is a coaxial cylindrical L-band 10 MW klystron in which cathodes are arranged at equal intervals on a circumference, a drift tube is installed on the central axis of each cathode, and a cavity resonator is arranged with a circular diameter concentric with the circle in which the cathode in TM010 mode is arranged, so that the electric field intensity in the axial direction in the cavity is maximized on the axis of the drift tube (i.e., the electron beam axis).

This multi-beam klystron design is characterized by making the electric field intensity distribution axisymmetric with respect to the axis of each electron beam, and, by the interaction between the electron beam and the electric field having a uniform and axisymmetric electric field intensity distribution with respect to each electron beam axis, realizes a highly efficient operation.

By applying this multi-beam klystron design method to pulse klystrons with peak output of several megawatts or more, a highly efficient operation at equivalent operating voltages can be expected, and thus performance improvements such as halving the operating voltage can be expected, although with equivalent operating efficiency.

A multi-beam klystron that reduces the operating voltage can be designed to increase the total perveance by using a large number of electron beams with a relatively high perveance per single beam. This multi-beam klystron design also has the advantage of size reduction since the interaction section is shortened.

When compared to a low-perveance multi-beam klystron, this multi-beam klystron design has a higher current per single beam, therefore, a higher focusing magnetic field intensity to focus the electron beams. To improve this, it is effective to increase the diameter of the electron beam and lower the current density of the electron beam.

In a case where the cavity resonator is a coaxial TM0n0 mode, the electric field intensity varies in the radial direction, but is constant in the circumferential direction. The electron beam axis is generally placed at a position where the electric field intensity in the axial direction is maximum at the radial position. In a case where the electron beam is located in a region where there is little change in the electric field intensity in the axial direction, electrons are accelerated and decelerated by a substantially uniform electric field. However, in a case where the electron beam is located in a region where there is a large change in the electric field intensity distribution, that is, in a case where the diameter of the drift tube is relatively large compared to the radial size of the cavity, the electric field for accelerating and decelerating the electron does not become axisymmetric with respect to the electron beam axis, and clustered electrons become non-axisymmetric, causing fluctuations in the electron beam orbit and a decrease in operating efficiency. This tendency becomes significant in a cavity resonator with a large drift tube diameter with respect to the wavelength in a resonant frequency; for example, in a case of C-band and X-band of a multi-beam klystron with a peak output power of several MW, it becomes noticeable in a case where, as a guideline for the relationship between the cavity and the drift tube diameter, the diameter of the drift tube exceeds approximately 0.2 times the cutoff diameter of high frequency in the TE11 mode in the resonant frequency of the cavity.

Therefore, in the present embodiment, even in a case where the diameter of the drift tube 32 is relatively large with respect to the wavelength in the resonant frequency, the non-axisymmetric electric field intensity distribution in the circumferential direction and the radial direction in the cavity 36 of the cavity resonator 31 is corrected to make the electric field intensity distribution axisymmetric with respect to the electron beam axis. As a result, the multi-beam klystron 10 is provided in which energy dispersion is reduced in the clustered electrons accelerated and decelerated by this electric field, operating efficiency reduction is suppressed, and output conversion efficiency is improved.

In order for the multi-beam klystron 10 to operate with high efficiency, it is effective to accelerate and decelerate electrons by making the distribution of the electric field of the cavity resonator 31 that interacts with the electron beam uniform with respect to the electron beam, that is, making the difference between the maximum electric field intensity and the average electric field intensity that interact with the electron beam small.

In a case where the cavity resonator 31 is a coaxial cylindrical TM010 mode, since the electric field intensity distribution in the circumferential direction at the same radial position is the same value regardless of the phase in the circumferential direction, the electric field intensity distribution at each drift tube 32 arranged on the coaxial circumference is the same. On the other hand, since the electric field intensity distribution in the radial direction is a mountainous distribution with a peak in the electric field intensity, depending on the relationship between the resonant frequency in the cavity 36 and the diameter size of the drift tube 32, the electric field intensity that interacts with the electron beam may change significantly, resulting in a different electric field intensity distribution from that in the circumferential direction.

Figure 4:
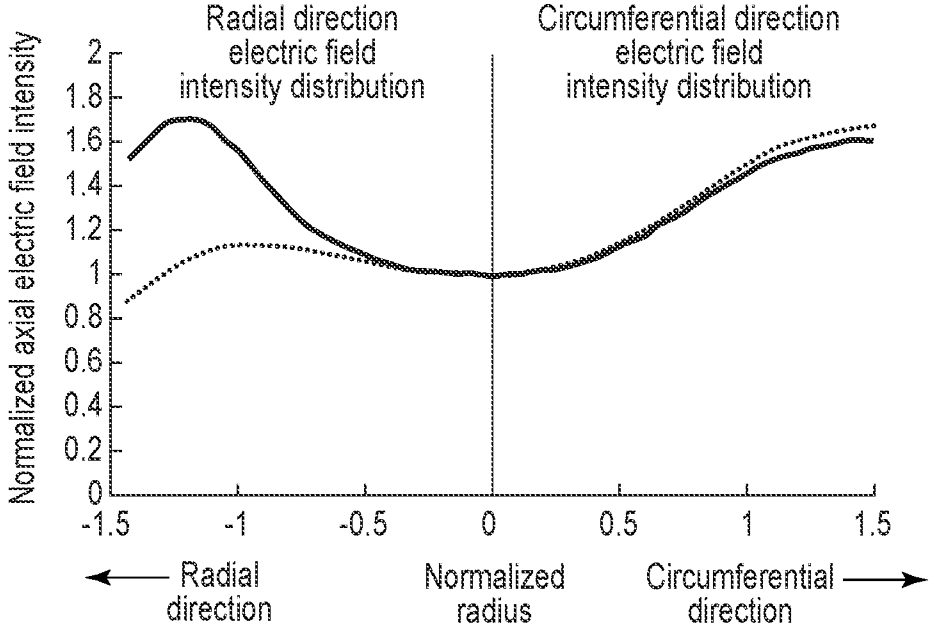
FIG. 4 is a graph showing a relationship between a normalized radius around an axis of a drift tube of the above cavity resonator and normalized axial electric field intensity.
Figure 5:
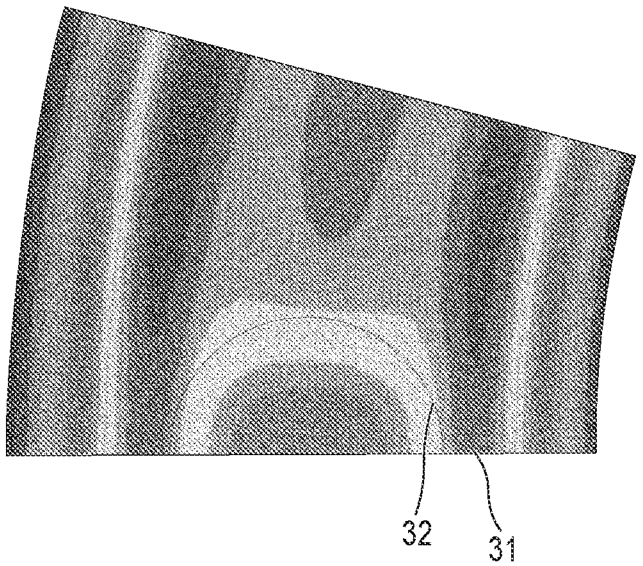
FIG. 5 is an electric field intensity distribution diagram around the drift tube of the above cavity resonator.
Figure 7:
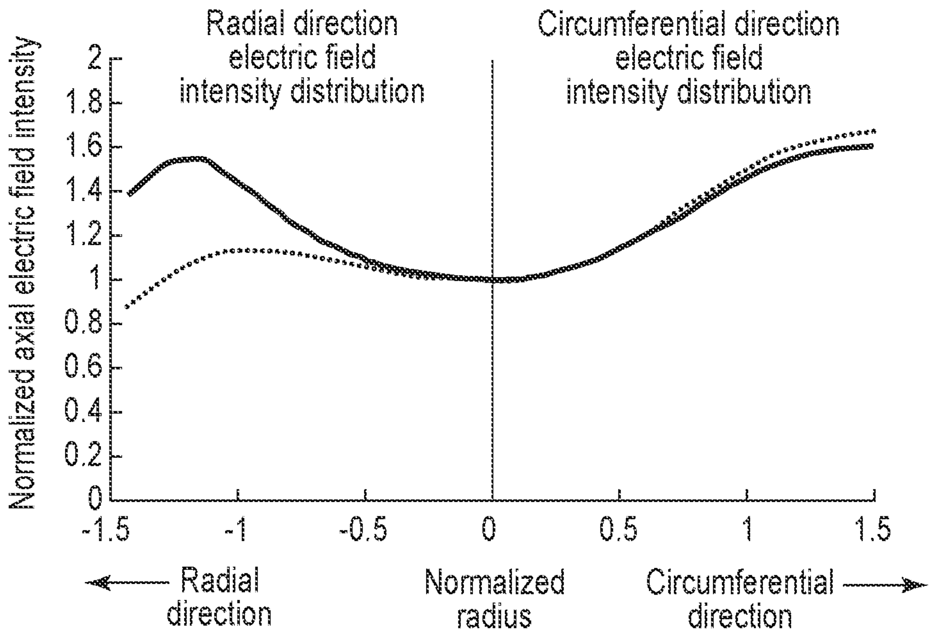
FIG. 7 is a graph showing a relationship between a normalized radius around an axis of a drift tube of the above cavity resonator and a normalized axial electric field intensity.
Figure 15:
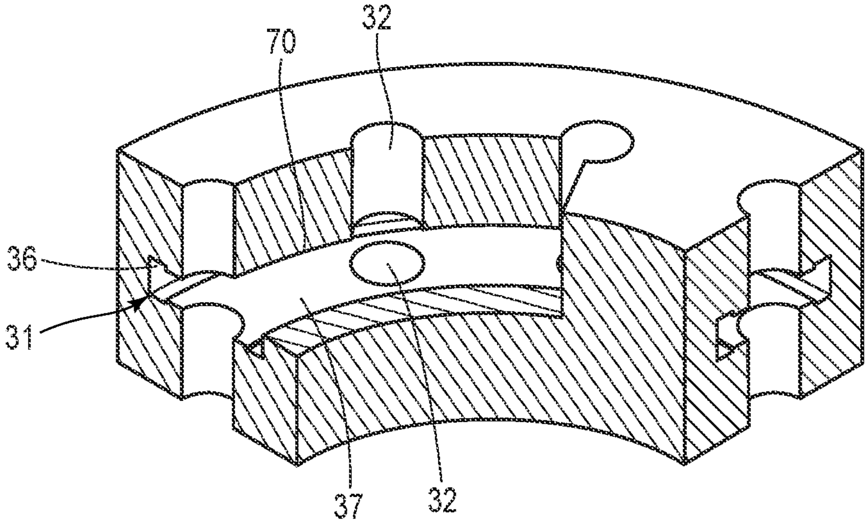
FIG. 15 is a perspective view of a part of a cavity resonator of Comparative Example 1.
Figure 16:
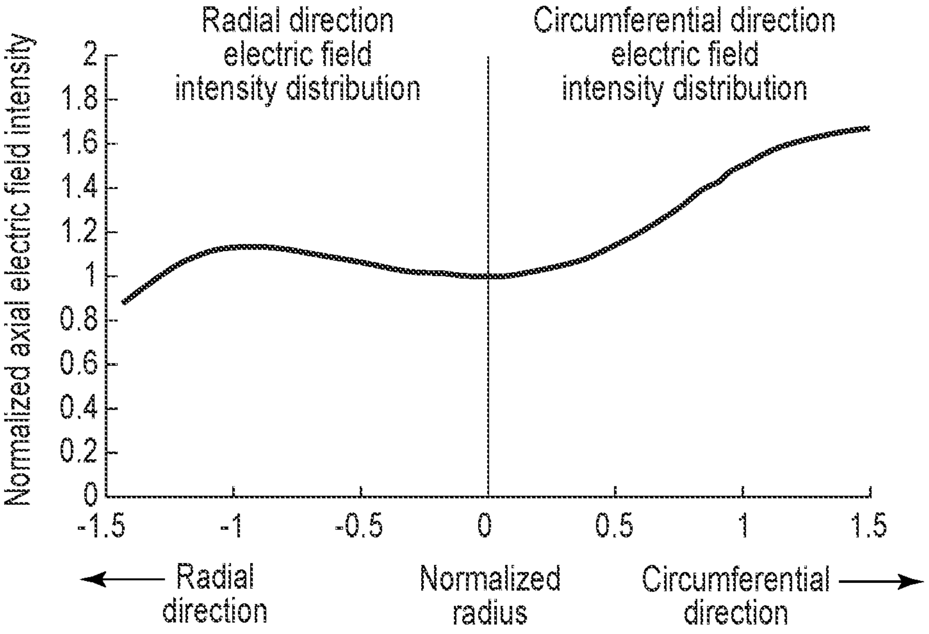
FIG. 16 is a graph showing a relationship between a normalized radius around an axis of a drift tube of the cavity resonator of Comparative Example 1 and a normalized axial electric field intensity.
Figure 17:
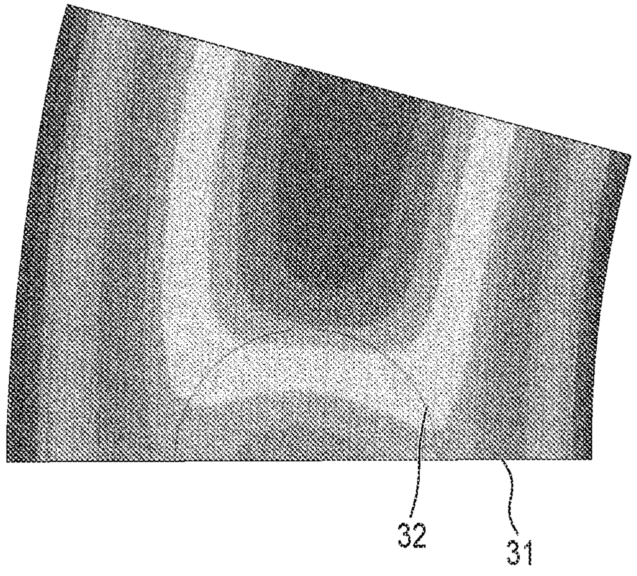
FIG. 17 is an electric field intensity distribution diagram around the drift tube of the cavity resonator of Comparative Example 1.

To solve this problem, the present embodiment comprises the electric field correction section 39. The cavity shape and electric field intensity distribution of the present embodiment that is provided with the electric field correction section 39 are shown in FIG. 3 to FIG. 5, and the cavity shape and electric field intensity distribution of Comparative Example 1 that is not provided with the electric field correction section 39 are shown in FIG. 15 to FIG. 17. FIG. 3 and FIG. 15 are perspective views of a part of the cavity resonator 31, FIG. 4 and FIG. 16 are graphs showing the relationship between the normalized radius around the axis of the drift tube 32 of the cavity resonator 31 and the normalized axial electric field intensity, and FIG. 5 and FIG. 17 are electric field intensity distribution diagrams around the drift tube 32 of the cavity resonator 31. Furthermore, the dotted line in FIG. 7 shows the electric field intensity distribution of Comparative Example 1, and the solid line shows the electric field intensity distribution of the present embodiment.

First, in Comparative Example 1, as described above, the electric field intensity distribution is non-axisymmetric between the circumferential direction and the radial direction with respect to the electron beam axis, and this non-axisymmetric electric field increases the energy dispersion within the cluster of electrons that are accelerated and decelerated, resulting in a decrease in operating efficiency and a decrease in output conversion efficiency.

In the case of the present embodiment, by narrowing the space of the gap section 38 by the projection 40 of the electric field correction section 39, the electric field intensity in the radial direction is increased, and the electric field intensity distribution becomes close to being axisymmetric in the circumferential direction and the radial direction with respect to the electron beam axis. In a general design, the electric field intensity at approximately 70% of the diameter of the drift tube 32, which is the outermost diameter of the electron beam, differs by 15% between the circumferential direction and the radial direction in Comparative Example 1; whereas, in the present embodiment, the difference can be improved to approximately 3%.

Thus, by correcting the non-axisymmetric electric field intensity distribution in the circumferential direction and the radial direction in the cavity 36 of the cavity resonator 31 and making the electric field intensity distribution axisymmetric with respect to the electron beam axis, the energy dispersion within the clustered electrons that are accelerated and decelerated by this electric field can be reduced, the operating efficiency reduction can be suppressed, and the output conversion efficiency can be improved.

Moreover, in a case where the electric field intensity distribution tends to be non-axisymmetric with respect to the electron beam axis, that is, in a case where the diameter of the drift tube 32 is at least 0.2 times the cutoff diameter of the TE11 mode high frequencies at the resonant frequency of the cavity resonator 31, even in a case where the diameter of the drift tube 32 is relatively large with respect to the wavelength at the resonant frequency, the non-axisymmetric electric field intensity distribution in the circumferential direction and the radial direction in the cavity 36 of the cavity resonator 31 can be corrected, and the electric field intensity distribution can be made axisymmetric with respect to the electron beam axis.

Furthermore, by providing the electric field correction section 39 at a position away from the position of the drift tube 32 on the surface of the nose section 37, the electric field intensity distribution in the radial direction at the cavity 36 of the cavity resonator 31 can be brought closer to the electric field intensity distribution in the circumferential direction.

Figure 6:
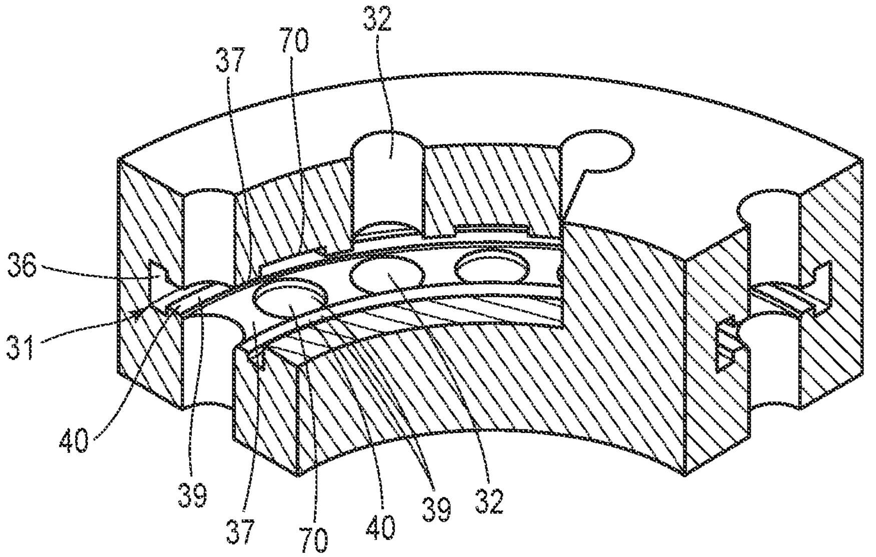
FIG. 6 is a perspective view of a part of a cavity resonator of a klystron device showing a second embodiment.
Figure 8:
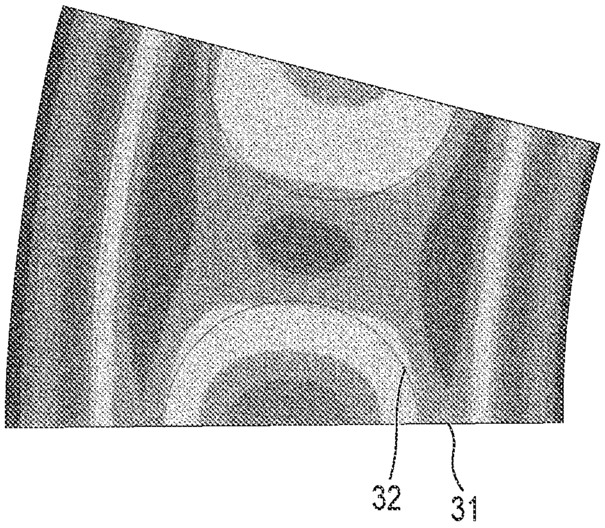
FIG. 8 is an electric field intensity distribution diagram around the drift tube of the above cavity resonator.

Next, a second embodiment will be shown in FIG. 6 to FIG. 8.

As shown in FIG. 6, an electric field correction section 39 is provided with recesses 70 on surfaces of nose sections 37 facing each other in an axial direction and at positions on both sides with respect to a drift tube 32 in a circumferential direction. The recesses 70 are formed in a circular concave shape, for example, recessed from the surface of the nose section 37 at a position away from the position of the drift tube 32 on the surface of the nose section 37. A gap section 38 between the recesses 70 facing each other in the axial direction has a wider space than a space d between the nose sections 37 and configure a circumferential electric field correction gap section.

By the recesses 70 of the electric field correction section 39 allowing the gap section 38 to have a wider space, it is possible to reduce the electric field intensity in the circumferential direction with respect to the axis of the drift tube 32, bring the electric field intensities in the circumferential direction and the radial direction closer, and make the electric field intensity distribution axisymmetric with respect to the axis of an electron beam.

Although simply providing the recesses 70 of the electric field correction section 39 in a cavity resonator 31 has the effect of bringing the electric field intensity distributions in the circumferential direction and the radial direction closer, by providing both projections 40 in the radial direction and the recesses 70 in the circumferential direction as the electric field correction section 39, it is possible to easily balance the electric field intensity distributions in the circumferential direction and the radial direction and control the shape of the electric field intensity distribution to some extent as well as axisymmetric with respect to the electron beam axis.

Figure 9:
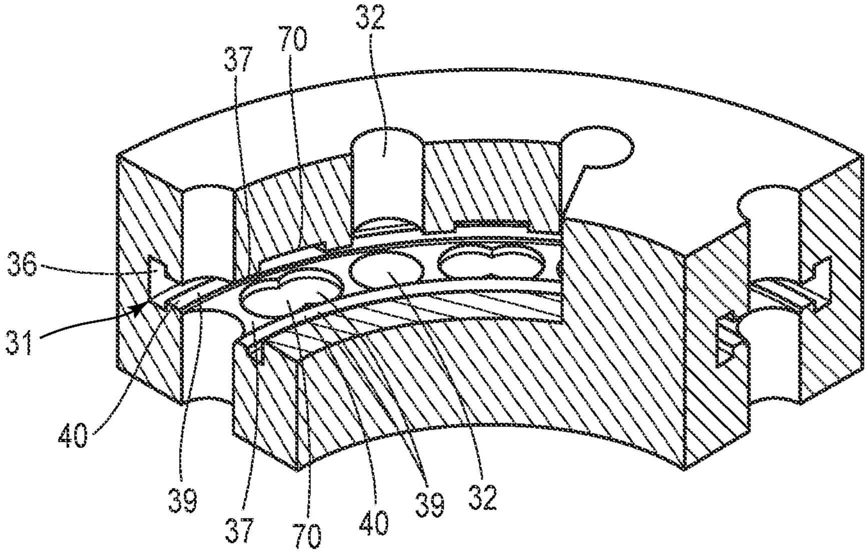
FIG. 9 is a perspective view of a part of a cavity resonator showing a third embodiment.
Figure 10:
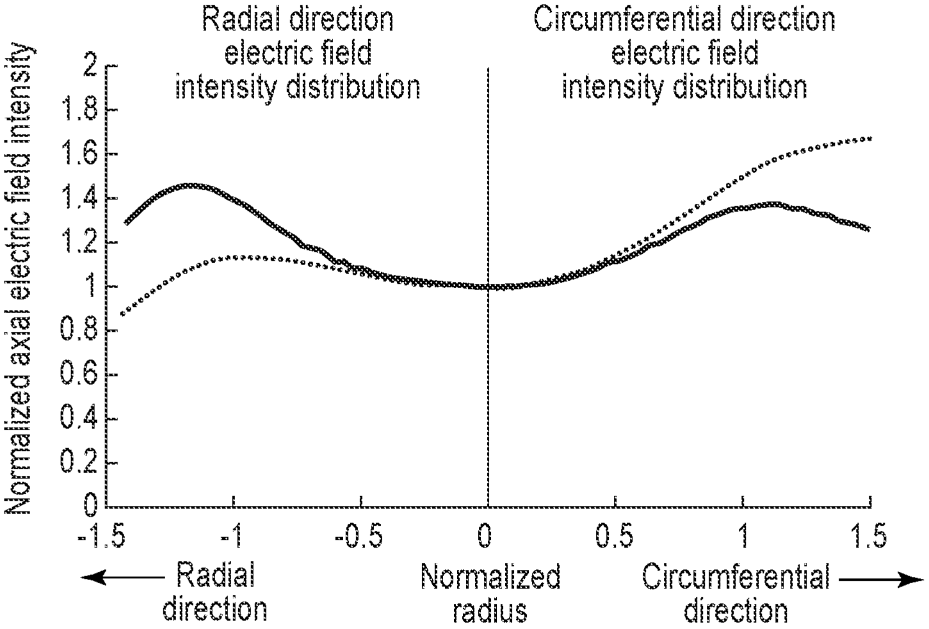
FIG. 10 is a graph showing a relationship between a normalized radius around an axis of a drift tube of the above cavity resonator and a normalized axial electric field intensity.
Figure 11:
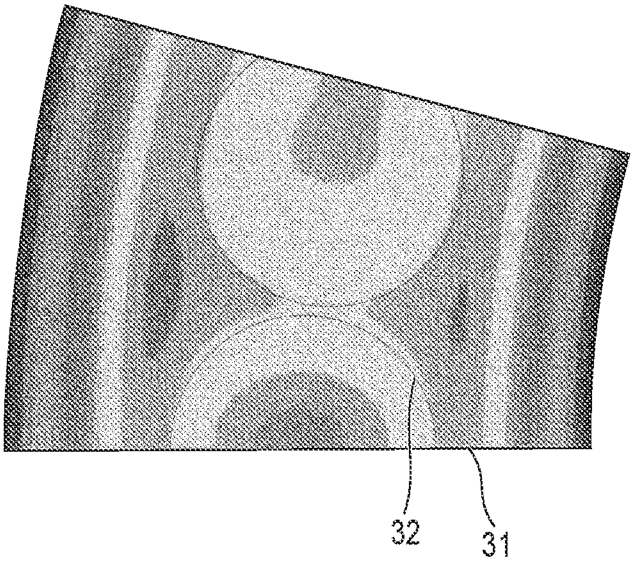
FIG. 11 is an electric field intensity distribution diagram around the drift tube of the above cavity resonator.

Next, FIG. 9 to FIG. 11 show a third embodiment.

As in the second embodiment, an electric field correction section 39 is provided with recesses 70 on surfaces of nose sections 37 facing each other in an axial direction and at positions on both sides with respect to a drift tube 32 in a circumferential direction; however, the range of recesses 70 is further widened. For example, two circular recesses 70 are provided so that they partially overlap each other.

By widening a range of space of a gap section 38 where it is to be widened by the recesses 70 of the electric field correction section 39, the electric field intensity in the circumferential direction with respect to the axis of the drift tube 32 can be further reduced, bringing the electric field intensity in the circumferential direction closer to the electric field intensity in the radial direction, and making the electric field intensity distribution axisymmetric with respect to the electron beam axis.

Figure 12:
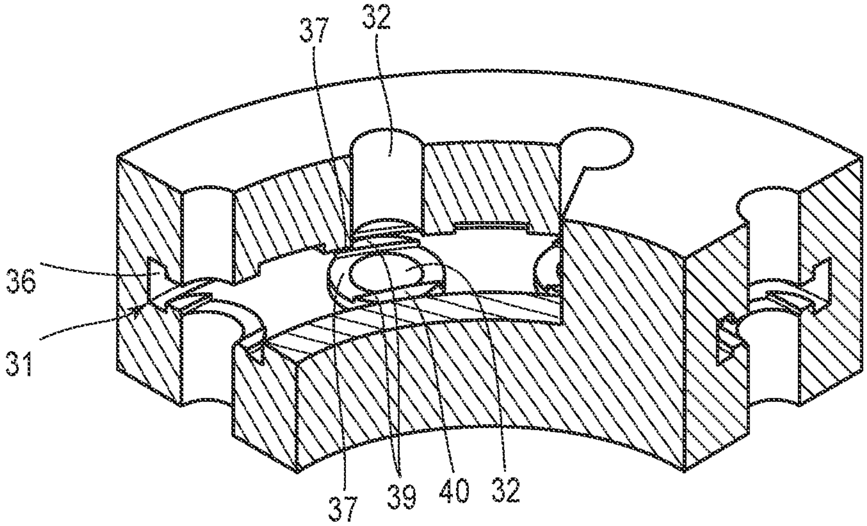
FIG. 12 is a perspective view of a part of a cavity resonator showing a fourth embodiment.
Figure 13:
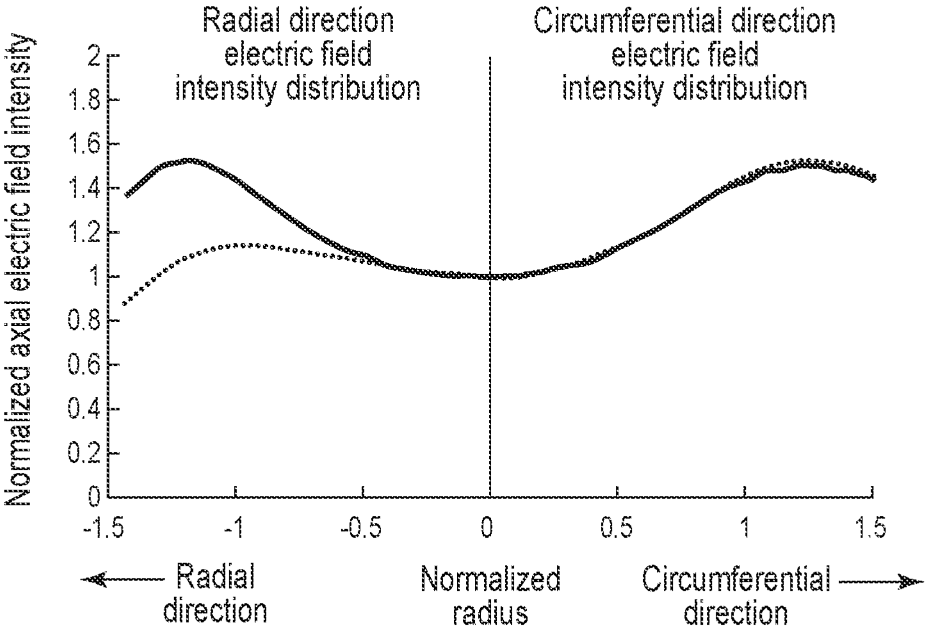
FIG. 13 is a graph showing a relationship between a normalized radius around an axis of a drift tube of the above cavity resonator and a normalized axial electric field intensity.
Figure 14:
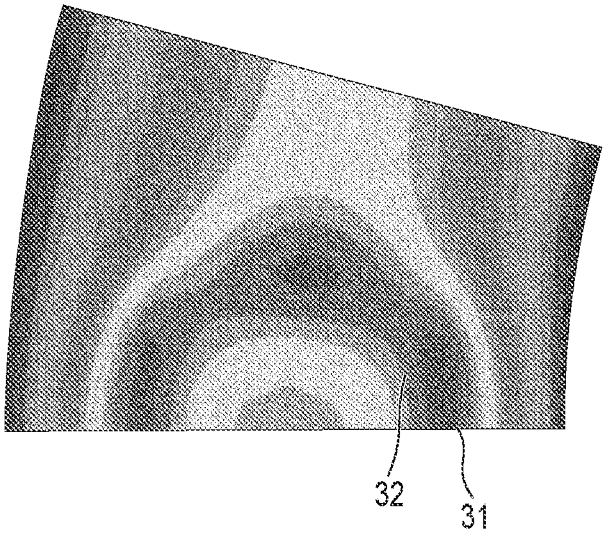
FIG. 14 is an electric field intensity distribution diagram around the drift tube of the above cavity resonator.

Next, FIG. 12 to FIG. 14 show a fourth embodiment.

A nose section 37 is provided for each drift tube 32 in a cylindrical shape protruding from the periphery of the drift tube 32.

An electric field correction section 39 is configured by projections 40 protruding from positions on both sides centering on the drift tube 32 in a radial direction, respectively.

By the projections 40 of the electric field correction section 39 making a space of a gap section 38 narrower than a space of the nose sections 37, it is possible to increase the electric field intensity in the radial direction with respect to the axis of the drift tube 32, bring the electric field intensities in the circumferential direction and the radial direction closer, and make the electric field intensity distribution axisymmetric with respect to the axis of an electron beam.

A fifth embodiment is described below with reference to FIG. 18 to FIG. 24.

Figure 18:
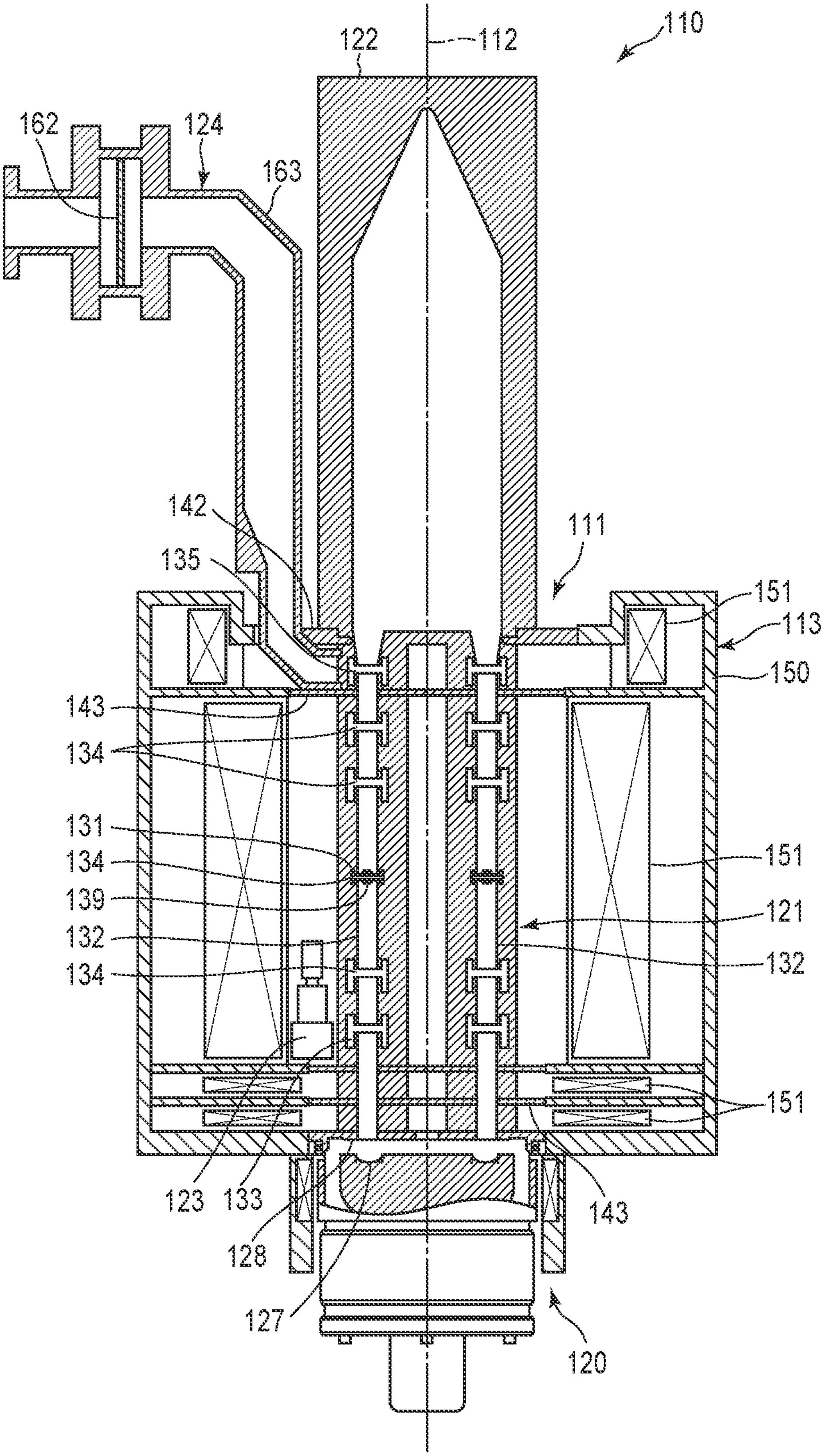
FIG. 18 is a cross-sectional view of a klystron device showing a fifth embodiment.

FIG. 18 shows an example of a multi-beam klystron 110 as a klystron device.

The multi-beam klystron 110 comprises a klystron body 111 and a focusing magnetic field device 113 that is arranged around a central axis 112, which is a tube axis of the klystron body 111.

The klystron body 111 comprises an electron gun section 120, an interaction section 121, a collector section 122, an input circuit section 123 and an output circuit section 124 connected to the interaction section 121.

The electron gun section 120 comprises a plurality of cathodes 127 and a plurality of anodes 128 facing these cathodes 127, respectively. The plurality of cathodes 127 and the plurality of anodes 128 are arranged at equal intervals on the same circumference of a predetermined radius from the central axis 112 of the klystron body 111, and generate a plurality of electron beams directed in the axial direction.

The interaction section 121 comprises a plurality of cavity resonators 131 arranged along the axial direction between the electron gun section 120 and the collector section 122, and a plurality of drift tubes (drift holes) 132 that connect the plurality of cavity resonators 131 in the axial direction. The cavity resonators 131 are a coaxial cylindrical TMmn0 mode ($m \geq 0$, $n \geq 1$), and, in the present embodiment, a coaxial cylindrical TM010 mode is used. That is, the plurality of drift tubes 132 communicating with the cavity resonators 131 face each other on the central axis of the plurality of cathodes 127 of the electron gun section 120, and are provided in a row at equal intervals on the same circumference of a predetermined radius from the central axis 112 of the klystron body 111, through which electron beams from the cathodes 127 pass, respectively. The center of the drift tube 132 is provided at a peak position of an electric field intensity in the radial direction of the cavity resonator 131.

The plurality of cavity resonators 131 each configure, in order from the electron gun section 120 to the collector section 122, an input cavity 133 into which a high frequency is input from the input circuit section 123, a plurality of intermediate cavities 134, and an output cavity 135 that outputs an amplified high frequency to the output circuit section 124. The intermediate cavities 134 is provided with an intermediate cavity 134 with a fundamental wave cavity resonator structure (rd/rc=0.23) and at least one intermediate cavity 134 with a coaxial harmonic cavity resonator structure having twice the resonant frequency (rd/rc=0.47). The coaxial harmonic cavity resonator structure having twice the resonant frequency (rd/rc=0.47) efficiently collects electrons located outside of the clustered electron beams, thereby increasing the quality of the cluster and the conversion efficiency to higher frequency waves without extending the length of the interaction section 121.

Figure 19A:
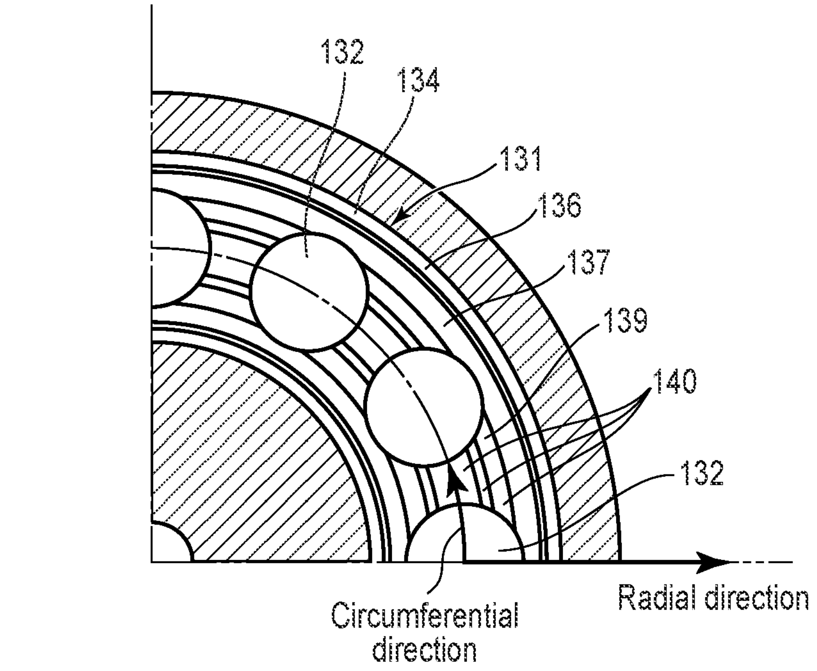
FIG. 19A shows a cavity resonator of the klystron device of the above fifth embodiment, and is a cross-sectional view in a direction intersecting an axial direction.
Figure 19B:
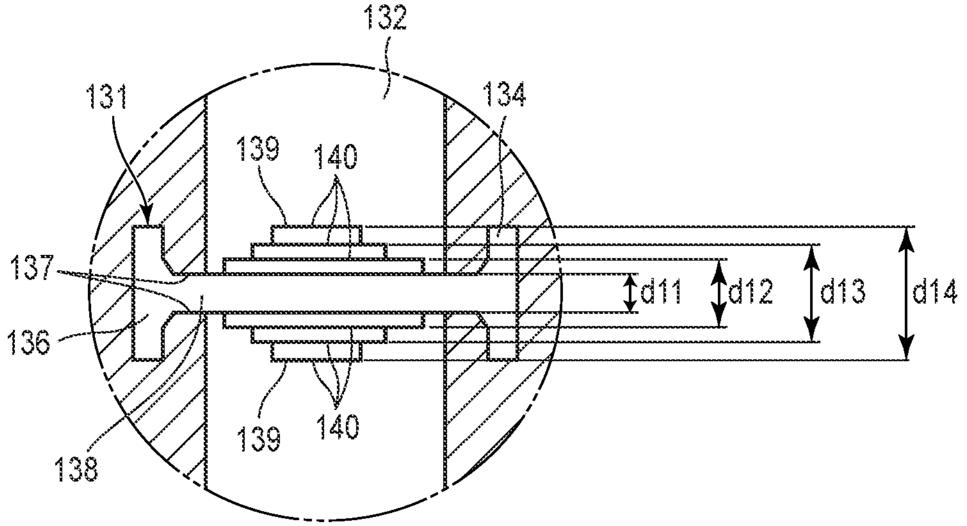
FIG. 19B shows the cavity resonator of the klystron device of the above fifth embodiment, and is an enlarged cross-sectional view in the axial direction.
Figure 20:
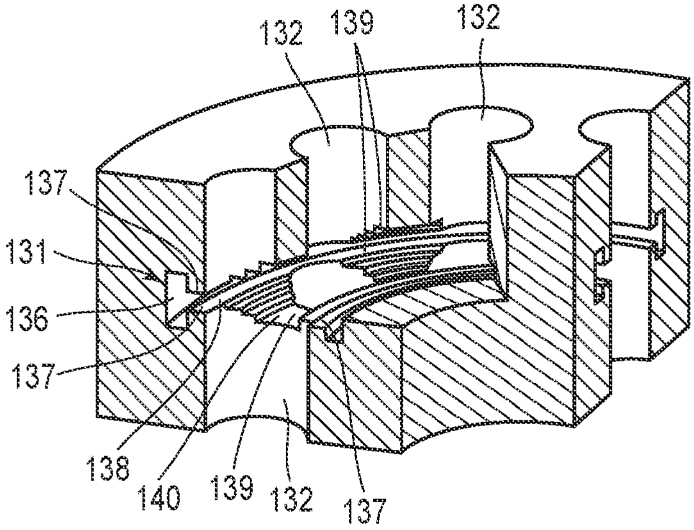
FIG. 20 is a perspective view of a part of a cavity resonator of the above fifth embodiment.

FIGS. 19A, 19B, and 20 show the cavity resonator 131 which is a harmonic cavity resonator. The cavity resonator 131 has a cylindrical or annular cavity 136 centered on the central axis 112. Nose sections 137 protrude from the inner surfaces of the cavity 136 facing each other in the axial direction, and the plurality of drift tubes 132 are communicated with this nose section 137. The nose section 137 protrudes annularly along the circumferential direction of the cavity 136 at a center position in the radial direction of the cavity 136. A gap section 138 with a predetermined space d11 communicating with the drift tube 132 is formed between the nose sections 137 facing each other in the axial direction.

The nose sections 137 facing each other in the axial direction are provided with cavity resonator voltage correction sections 139 for correcting a cavity resonator voltage. The cavity resonator voltage correction section 139 is provided at a position of the nose section 137 corresponding to the circumferential direction of the cavity resonator 131. The cavity resonator voltage correction section 139 is configured by grooves 140 that are recessed from the surface of the nose section 137 at positions on both sides of the circumferential direction centered on the drift tube 132. The grooves 140 are provided along the circumferential direction of the cavity resonator 131 so as to be connected to the drift tube 132 and connect adjacent drift tubes 132 in the circumferential direction. The cavity resonator voltage correction section 139 makes spaces d12, d13, and d14 of the gap section 138 at the location of the nose section 137 corresponding to the circumferential direction of the cavity resonator 131 larger than the space d11 of the gap section 138 at the location of the nose section 137 corresponding to the radial direction of the cavity resonator 131.

The grooves 140 have the greatest amount of concavity at a position passing through the center of the drift tube 132 in the circumferential direction, and the amount of concavity becomes gradually smaller at positions on the center side and the outer side of the cavity resonator 131 in the radial direction than at the position in the circumferential direction passing through the center of the drift tube 132. The gap section 138 between the grooves 140 of the cavity resonator voltage correction section 139 facing each other in the axial direction is larger than the space d11 of the gap section 138 between the nose sections 137, the space d14 of the gap section 138 at the position passing through the center of the drift tube 132 in the circumferential direction is the largest, and the spaces d13 and d12 of the gap section 138 gradually decrease from the position passing through the center of the drift tube 132 in the circumferential direction toward the positions on the center side and the outer side of the cavity resonator 131 in the radial direction. Therefore, the spaces d12, d13, and d14 of the gap section 138 change in steps or a staircase-like manner by the cavity resonator voltage correction section 139 provided at the position of the nose section 137 corresponding to the circumferential direction of the cavity resonator 131. Note that the spaces of the gap section 138 may vary continuously.

Furthermore, a plurality of magnetic elements 143 are arranged around the klystron body 111 to form a plurality of magnetic field sections between the anode 128 and a collector pole piece 142 on the collector section 122 side.

The focusing magnetic field device 113 generates a magnetic field for converging electron beams and is configured by an electromagnet, for example. The focusing magnetic field device 113 has a magnetic housing 150 for forming a plurality of magnetic field sections together with the plurality of magnetic elements 143 of the klystron body 111, and a plurality of coils 151 arranged for each magnetic field section.

The focusing magnetic field device 113 generates a magnetic field parallel to the tube axis of the klystron body 111 at different magnetic field intensities in each magnetic field section. Two magnetic field sections are provided between the anode 128 and the input cavity 133 of the klystron body 111. These two magnetic field sections are matching sections to focus the electron beams from the cathode 127 and to make the electron beams parallel to the tube axis of the klystron body 111 beyond the input cavity 133.

The electron beam that has become a desired diameter by the matching section then enters the input cavity 133. Electrons are accelerated and decelerated by the phase of the high frequency input to the input cavity 133, and are velocity-modulated. While the electrons are traveling through a uniform electric field, a density modulation is generated in which the accelerated electrons and the decelerated electrons gather, respectively, resulting in clustering of electrons. The clustered electrons are gradually intensified by a self-induced high-frequency electric field in the plurality of intermediate cavities 134. When the clustered electrons pass through the output cavity 135, a strong alternating electric field is induced, and an amplified high-power high frequency is output from the output cavity 135 to the outside.

The input circuit section 123 inputs high frequencies from the outside and directs them to the input cavity 133.

The output circuit section 124 comprises an output window 162 that outputs amplified high frequencies to the outside and an output waveguide 163 that leads the high frequencies to be output from the output cavity 135 to the output window 162.

By the way, in general, in a multi-beam klystron, by using a plurality of cathodes and a plurality of drift tubes, while keeping the ratio of the beam current to the beam voltage, referred to as perveance per single electron beam, low, the value of the total perveance can be made large. It is generally known in the art that the output conversion efficiency of a multi-beam klystron is higher when the perveance per single electron beam is smaller; therefore, the multi-beam klystron can achieve operations with higher operating efficiency by low operating voltage than a single-beam klystron.

For example, in a multi-beam klystron with a peak output exceeding megawatts, there is an L-band 10 MW klystron in which cathodes are arranged at equal intervals on a circumference around a klystron tube axis, a hole (drift hole) that serves as a drift tube is provided on the central axis of each cathode, and a cavity resonator is a cylinder concentric with a circle in which the cathodes in TM010 mode are arranged and is a coaxial cavity resonator in which the electric field intensity in the axial direction in the cavity resonator is maximized on the axis of a drift tube (i.e., the electron beam axis).

The design of this multi-beam klystron is characterized by making the electromagnetic field distribution axisymmetric with respect to each electron beam axis, and a highly efficient operation is realized by the interaction between the electron beam and the electromagnetic field, which is uniform and axisymmetric with respect to each electron beam.

By applying this multi-beam klystron design method to pulse klystrons with peak output of several megawatts or more, performance improvements can be expected, ranging from achieving high-efficiency operation at the same operating voltage to halving the operating voltage while achieving the same operating efficiency.

A possible multi-beam klystron design that reduces operating voltage would be to use a plurality of electron beams with relatively high perveance per single electron beam, resulting in a high overall perveance. The design with a low operating voltage makes it possible to shorten the insulation distance at an electron gun electrode, and, also, reduces the traveling speed of electrons, which shortens the length of the electron gun section and the length of the interaction section; therefore, has the advantage size reduction.

A multi-beam klystron with high perveance per single electron beam has a higher current per single electron beam compared to a multi-beam klystron with low perveance and thus a larger focusing magnetic field intensity for converging the electron beam. To improve this, it is effective to increase the diameter of the electron beam and reduce the current density of the electron beam.

In the TM0n0 mode in a coaxial cavity resonator, the electric field intensity varies in the radial direction of the cavity resonator in a case where there is no drift tube; however, the electric field intensity is constant in the circumferential direction. The drift tube through which the electron beam passes is generally placed at a position where the electric field intensity in the axial direction is maximum at the radial position.

Acceleration and deceleration of the electron beam is performed by a cavity resonator voltage considering a beam coupling coefficient, which is a value obtained by multiplying a voltage obtained by integrating the electric field intensity on the axis along which the electron beam travels by the beam coupling coefficient due to an electron beam travel angle.

Even in the case where a drift hole is present, the electric field intensity distribution has the same tendency as above, and the cavity resonator voltage in the circumferential direction of the cavity resonator is approximately constant; however, in the radial direction, the cavity resonator voltage decreases as the distance from the peak position of the electric field increases. Therefore, in a case where the diameter of the drift tube is small compared to the wavelength of the resonant frequency of the cavity resonator, electrons are accelerated and decelerated with an approximately uniform cavity resonator voltage; however, in a case where the diameter of the drift tube is large and the electron beam comes to a range where the cavity resonator voltage changes significantly in the radial direction, the acceleration and deceleration of the electrons are not performed uniformly, and the cluster of the electron beam becomes uneven and asymmetric, causing fluctuations in the electron beam orbit and a decrease in operating efficiency. This influence is noticeable in a case where the ratio (rd/rc) of the drift tube diameter to the cutoff diameter of the TE11 mode at the resonant frequency of the cavity resonator exceeds approximately 0.2, as a guideline for the relationship between the cavity resonator and the drift tube diameter, and, in the case of a multi-beam klystron with a peak output power of several MW, this may apply to cavity resonators in an S-band or higher band.

Therefore, the present embodiment equalizes the distribution of the cavity resonator voltage considering the coupling coefficient with the electron beam, which is an essential parameter with respect to the cluster of electron beam, rather than the electric field intensity in the gap section 138 of the cavity resonator 131.

Note that, the following Equation 1 represents the cavity resonator voltage including the coupling coefficient of the cavity resonator 131. The following Equation 2 represents the above coupling coefficient k. Here, fc is the resonant frequency of the cavity resonator 131, and ve is an electron velocity.

$$V_{cav\text{-}e,line} = \int_{line} E_z(r, z) \cdot \cos(kz) dz \quad \text{Equation 1}$$

$$k = \frac{2\pi \cdot f_c}{v_e} \quad \text{Equation 2}$$

Figure 21:
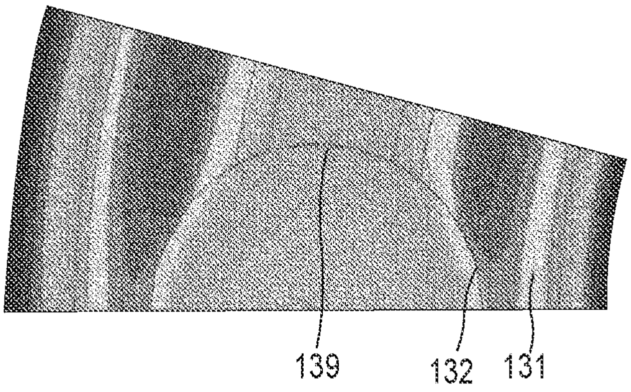
FIG. 21 is an electric field intensity distribution diagram around a drift tube of the cavity resonator of the above fifth embodiment.
Figure 22:
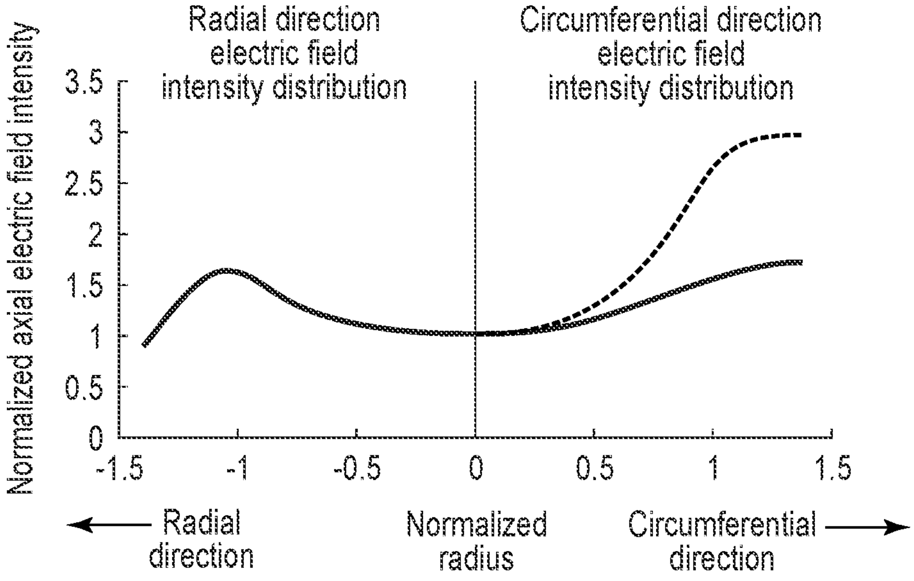
FIG. 22 is a graph showing a relationship between a normalized radius around an axis of the drift tube of the cavity resonator of the above fifth embodiment and a normalized axial electric field intensity.
Figure 23:
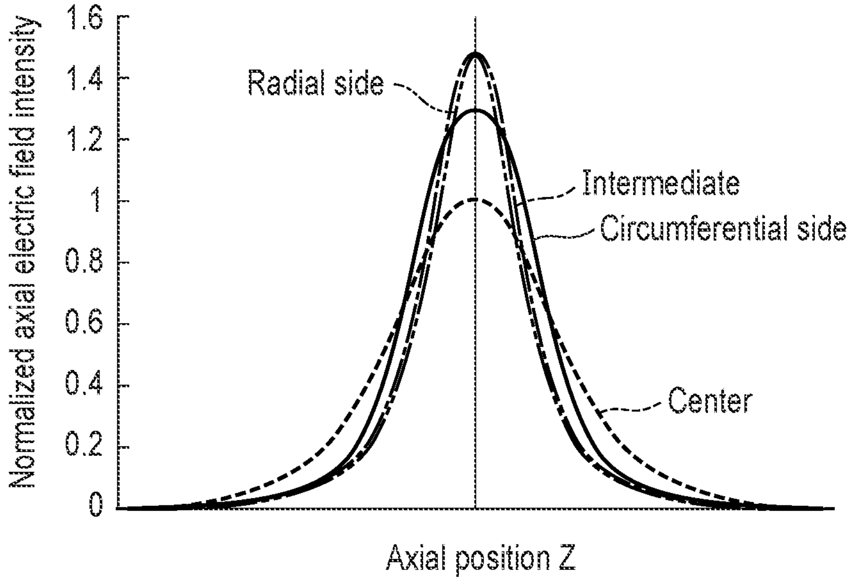
FIG. 23 is a graph showing a relationship between an axial position and the normalized axial electric field intensity for each cavity resonator voltage evaluation axis of the cavity resonator of the above fifth embodiment.
Figures 24, 25:
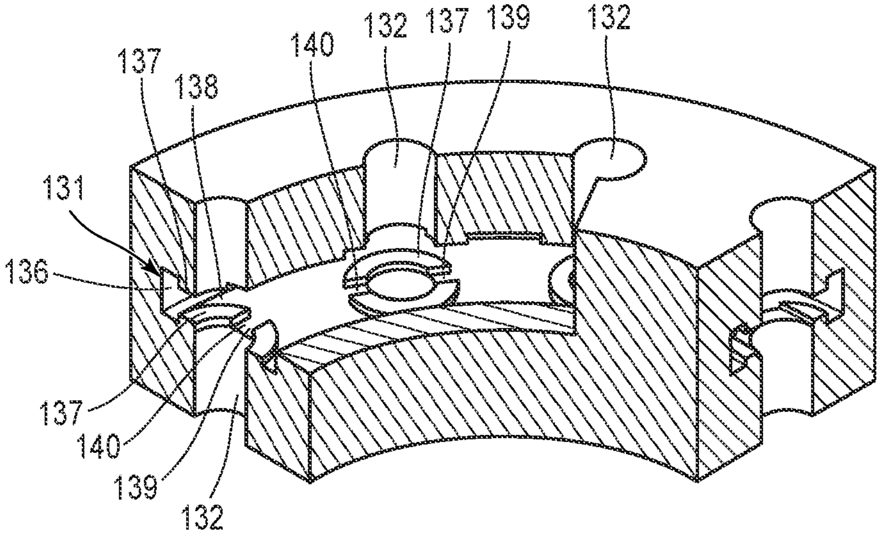
FIG. 24 shows a table of normalized cavity resonator voltages considering a beam coupling coefficient for each cavity resonator voltage evaluation axis of the cavity resonator for the fifth embodiment and Comparative Example 2.
FIG. 25 is a perspective view of a part of a cavity resonator of a klystron device showing a sixth embodiment.
Figure 30:
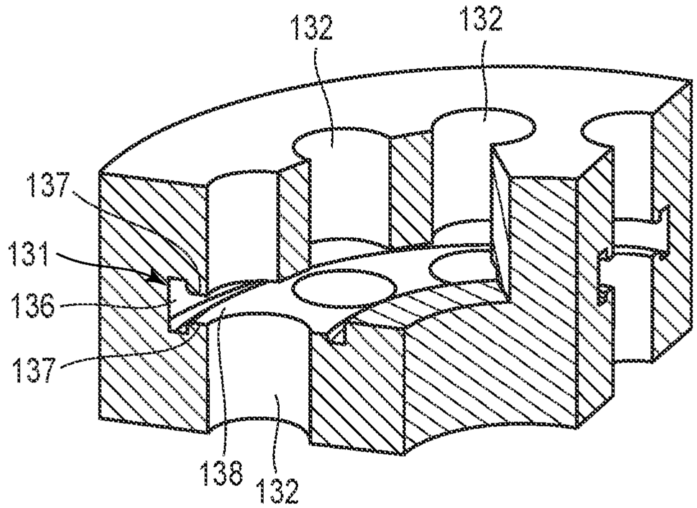
FIG. 30 is a perspective view of a part of the cavity resonator of Comparative Example 2.
Figure 31:
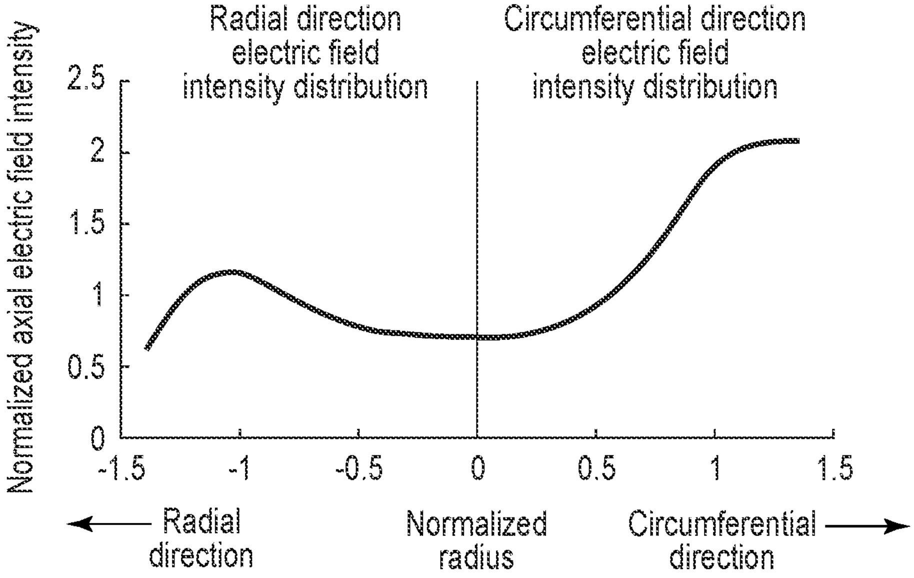
FIG. 31 is a graph showing a relationship between a normalized radius around an axis of a drift tube of the cavity resonator of Comparative Example 2 and a normalized axial electric field intensity.
Figure 32:
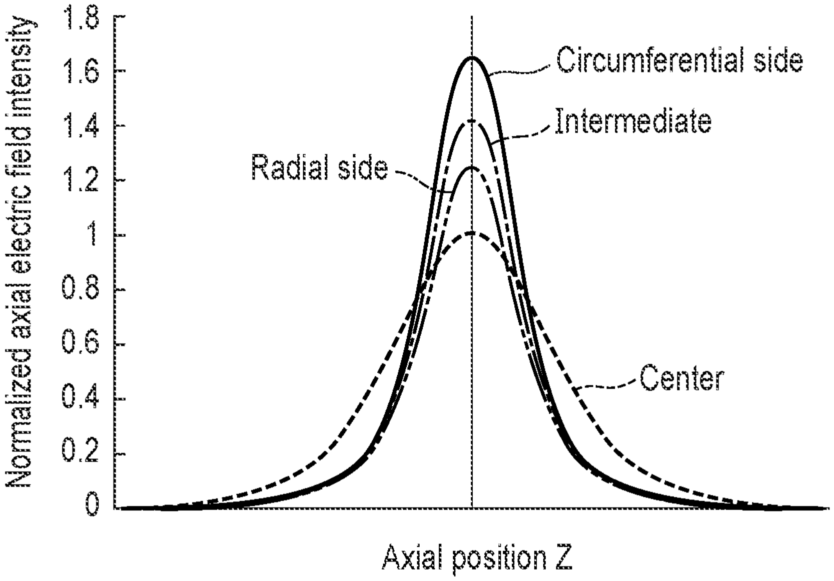
FIG. 32 is a graph showing a relationship between an axial position and the normalized axial electric field intensity for each cavity resonator voltage evaluation axis of the cavity resonator of Comparative Example 2.

The fifth embodiment can equalize the distribution of the cavity resonator voltage by means of the cavity resonator voltage correction section 139. Regarding the fifth embodiment provided with the cavity resonator voltage correction section 139, FIG. 20 is a perspective view of a part of the cavity resonator 131, FIG. 21 is an electric field intensity distribution diagram around the drift tube 132 of the cavity resonator 131, FIG. 22 is a graph showing a relationship between a normalized radius around an axis of the drift tube 132 of the cavity resonator 131 and a normalized axial electric field intensity, FIG. 23 is a graph showing a relationship between an axial position and the normalized axial electric field intensity for each cavity resonator voltage evaluation axis of the cavity resonator 131, and FIG. 24 shows a table of normalized cavity resonator voltages considering a beam coupling coefficient of the cavity resonator 131 for the fifth embodiment and Comparative Example 2. Regarding Comparative Example 2, in which the surface of the nose section 137 is entirely flat and the cavity resonator voltage correction section 139 is not provided, FIG. 30 is a perspective view of a part of the cavity resonator 131, FIG. 31 is a graph showing a relationship between a normalized radius around an axis of the drift tube 132 of the cavity resonator 131 and a normalized axial electric field intensity, and FIG. 32 is a graph showing a relationship between an axial position and the normalized axial electric field intensity for each cavity resonator voltage evaluation axis of the cavity resonator 131. Note that, in FIG. 22, the solid line shows the electric field intensity distribution of the fifth embodiment, and the dotted line shows the electric field intensity distribution of Comparative Example 2. The cavity resonator voltage evaluation axes in FIG. 23 and FIG. 32 includes an axis at the center of the drift tube 132, an axis on a circumferential side on the circumference of 70% of the diameter of the drift tube 132, which is the outermost diameter of the electron beam, an axis on a radial side of the circumference of 70% of the diameter of the drift tube 132, and an axis intermediate between the circumferential side and the radial side on the circumference of 70% of the diameter of the drift tube 132.

In Comparative Example 2, as shown in FIG. 24, the distribution of the cavity resonator voltage was non-axisymmetric between the circumferential side and the radial side with respect to the electron beam axis, and the deviation of the cavity resonator voltage between the circumferential side and the radial side was 31%. This large deviation of the cavity resonator voltage increases the energy dispersion within the cluster of electrons that are accelerated and decelerated, resulting in a decrease in operating efficiency and a decrease in output conversion efficiency.

In order for the multi-beam klystron 110 to operate with high efficiency, it is effective to accelerate and decelerate the electrons by making the cavity resonator voltage of the cavity resonator 131 that interacts with the electron beams uniform with respect to the electron beams (a distribution where variation is small in the cavity resonator voltage including the effect of the traveling angle of the electron beam interacting with the electron beam in a region where the electron beam passes through at the cavity resonator gap).

In a coaxial TM010 mode, in a case where there is no drift hole, the electric field intensities at the same radial position have the same value regardless of the circumferential phase, but the distribution in the radial direction becomes a mountain-shaped distribution with a peak in the electric field intensity.

Therefore, the distribution of the cavity resonator voltage on the circumference of the electron beam diameter concentric with the drift tube 132, which is the range of each electron beam, has a lower value in the radial direction compared to a value in the circumferential direction of the cavity resonator 131. Moreover, as the ratio of the diameter of the drift tube 132 to the cavity resonant frequency wavelength increases, the difference between the cavity resonator voltage in the circumferential and radial directions of the cavity resonator 131 interacting with the electron beam increases.

To correct the unequal distribution of the cavity resonator voltage in the cavity resonator 131 (harmonic cavity resonator), it is effective to widen the space of the gap section 138 on the high voltage side and narrow the space of the gap section 138 on the low voltage side, and change the distribution of the cavity resonator voltage considering the coupling coefficient with the electron beam in the drift tube 132.

The difference in the space of the gap section 138 of the cavity resonator 131 changes the electric field intensity distribution in the axial direction of the electron beam, which makes it possible to adjust the traveling angle of the electrons and control the cavity resonator voltage.

In the case of the fifth embodiment, the cavity resonator voltage correction section 139 widens the space of the gap section 138 in the range of the drift tube 132 where the cavity resonator voltage is high, thus controlling the electric field intensity distribution of the electron beam in the axial direction and making the cavity resonator voltage distribution closer to a distribution that is axisymmetric with respect to the central axis of the drift tube 132. Therefore, as shown in FIG. 24, the deviation of the cavity resonator voltage was improved from 31% in Comparative Example 2 to 9%. By performing electron acceleration and deceleration at the cavity resonator voltage with this small deviation, a decrease in efficiency can be prevented.

Thus, by correcting the non-axisymmetric cavity resonator voltage between the circumferential and radial directions of the cavity resonator 131 and bringing it closer to the distribution of the cavity resonator voltage that is axisymmetric with respect to the electron beam axis, the energy dispersion within the cluster of electrons accelerated and decelerated by this cavity resonator voltage is reduced, reduction in operating efficiency is suppressed, and output conversion efficiency can be improved.

Next, a sixth embodiment is shown in FIG. 25 to FIG. 29.

Figure 26:
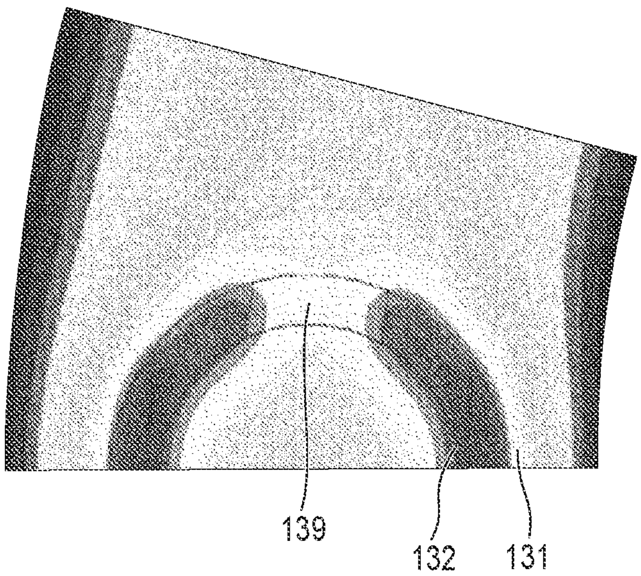
FIG. 26 is an electric field intensity distribution diagram around a drift tube of the cavity resonator of the above sixth embodiment.
Figure 27:
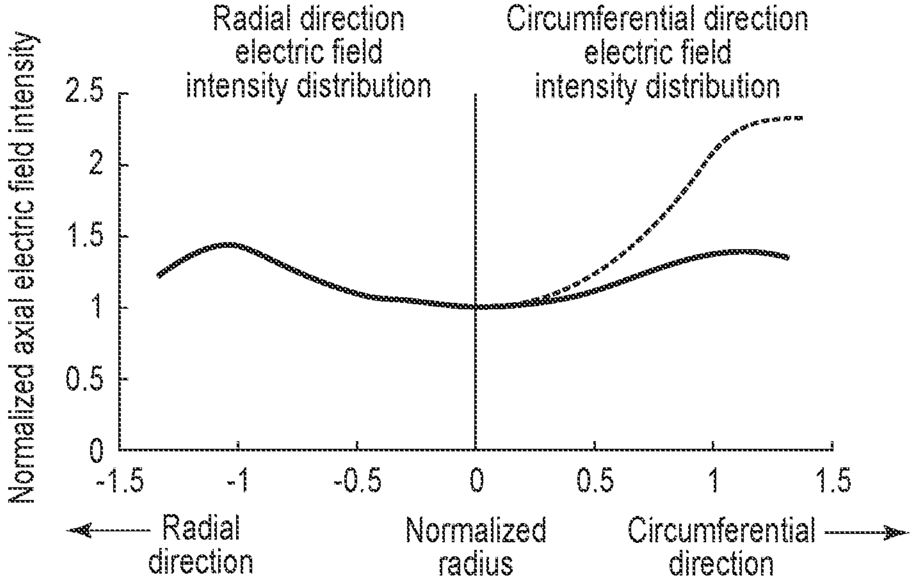
FIG. 27 is a graph showing a relationship between a normalized radius around an axis of the drift tube of the cavity resonator of the above sixth embodiment and a normalized axial electric field intensity.
Figures 28, 29:
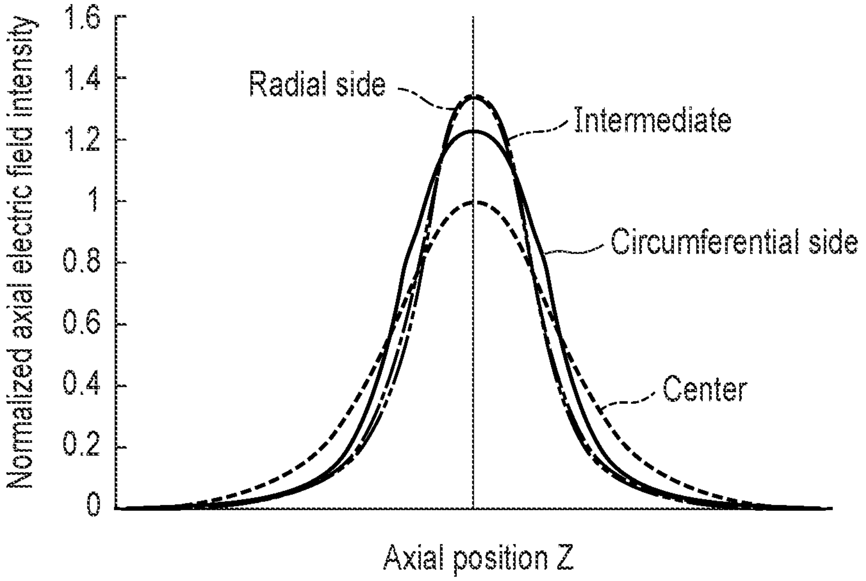
FIG. 28 is a graph showing a relationship between an axial position and the normalized axial electric field intensity for each cavity resonator voltage evaluation axis of the cavity resonator of the above sixth embodiment.
FIG. 29 shows a table of normalized cavity resonator voltages considering a beam coupling coefficient for each cavity resonator voltage evaluation axis of cavity resonators for the sixth embodiment and Comparative Example 3.

FIG. 25 is a perspective view of a part of a cavity resonator 131, FIG. 26 is an electric field intensity distribution diagram around a drift tube 132 of the cavity resonator 131, FIG. 27 is a graph showing a relationship between a normalized radius around an axis of the drift tube 132 of the cavity resonator 131 and a normalized axial electric field intensity, FIG. 28 is a graph showing a relationship between an axial position and the normalized axial electric field intensity for each cavity resonator voltage evaluation axis of the cavity resonator 131, and FIG. 29 shows a table of normalized cavity resonator voltages considering a beam coupling coefficient for each cavity resonator voltage evaluation axis of cavity resonators 131 for the sixth embodiment and Comparative Example 3. Note that, in FIG. 27, the solid line shows an electric field intensity distribution of the present embodiment, and the dotted line shows an electric field intensity distribution of Comparison Example 3. The cavity resonator voltage evaluation axis in FIG. 28 is as described above.

As shown in FIG. 25, the cavity resonator 131 has a coaxial harmonic cavity resonator structure (rd/rc=0.47). A nose section 137 of the cavity resonator 131 is provided in a cylindrical shape protruding into the cavity from the periphery of the drift tube 132 for each drift tube 132.

A cavity resonator voltage correction section 139 is configured by a groove 140 provided in the nose section 137 corresponding to positions on both sides of the circumferential direction around the drift tube 132.

The groove 140 of the cavity resonator voltage correction section 139 causes a space of a gap section 138 to become larger than a space at the nose section 137, thereby increasing a cavity resonator voltage in the circumferential direction with respect to the axis of the drift tube 132, bringing the cavity resonator voltages in the circumferential direction and the radial direction closer, and making the cavity resonator voltage axisymmetric with respect to the electron beam axis.

In the case of Comparative Example 3, where the groove 140 of the cavity resonator voltage correction section 139 is not provided in the nose section 137, as shown in FIG. 29, the distribution of the cavity resonator voltage became non-axisymmetric between the circumferential side and the radial side with respect to the electron beam axis, and the deviation of the cavity resonator voltage between the circumferential side and the radial side was 25%. This large deviation of the cavity resonator voltage increases the energy dispersion within the cluster of electrons that are accelerated and decelerated, resulting in a decrease in operating efficiency and a decrease in output conversion efficiency.

In the case of the sixth embodiment, the deviation of the cavity resonator voltage was improved from 25% in Comparative Example 3 to 6%. By performing electron acceleration and deceleration at the cavity resonator voltage with this small deviation, a decrease in efficiency can be prevented.

Thus, by correcting the non-axisymmetric cavity resonator voltage between the circumferential and radial directions of the cavity resonator 131 and bringing it closer to the distribution of the cavity resonator voltage that is axisymmetric with respect to the electron beam axis, the energy dispersion within the cluster of electrons accelerated and decelerated by this cavity resonator voltage is reduced, reduction in operating efficiency is suppressed, and output conversion efficiency can be improved.

Figure 33:
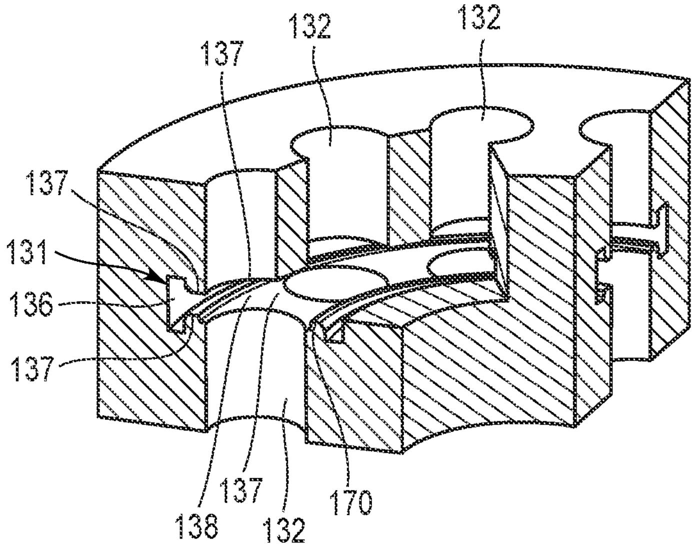
FIG. 33 is a perspective view of a part of a cavity resonator of Comparative Example 4.
Figure 34:
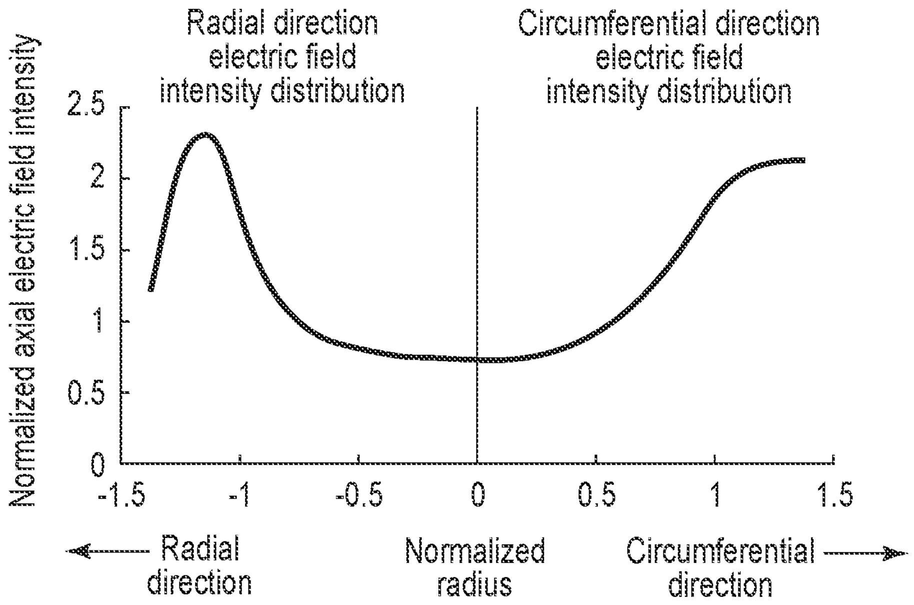
FIG. 34 is a graph showing a relationship between a normalized radius around an axis of a drift tube of the cavity resonator of Comparative Example 4 and a normalized axial electric field intensity.
Figure 35:
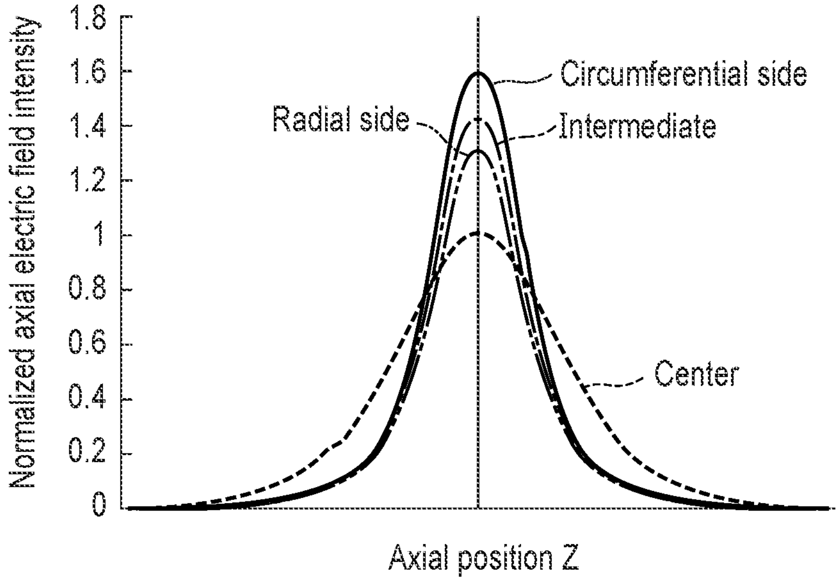
FIG. 35 is a graph showing a relationship between an axial position and the normalized axial electric field intensity for each cavity resonator voltage evaluation axis of the cavity resonator of Comparative Example 4.
Figures 36, 37:
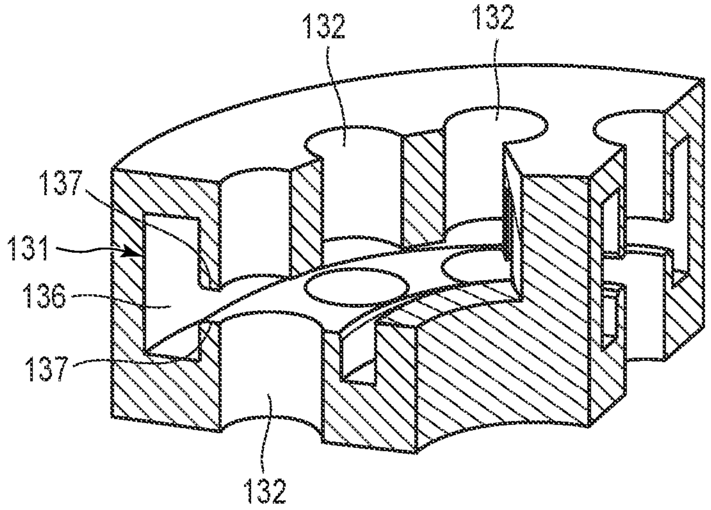
FIG. 36 shows a table of normalized cavity resonator voltages considering a beam coupling coefficient for each cavity resonator voltage evaluation axis of the cavity resonators for Comparative Example 2 and Comparative Example 4.
FIG. 37 is a perspective view of a part of a cavity resonator of Comparative Example 5.

Comparative Example 4 is also shown in FIG. 33 to FIG. 36. FIG. 33 is a perspective view of a part of a cavity resonator 131, FIG. 34 is a graph showing a relationship between a normalized radius around an axis of a drift tube 132 of the cavity resonator 131 and a normalized axial electric field intensity, FIG. 35 is a graph showing a relationship between an axial position and the normalized axial electric field intensity for each cavity resonator voltage evaluation axis of the cavity resonator 131, and FIG. 36 shows a table of normalized cavity resonator voltages considering a beam coupling coefficient for each cavity resonator voltage evaluation axis of the cavity resonators 131 for Comparative Example 2 and Comparative Example 4. Note that the cavity resonator voltage evaluation axis in FIG. 35 is as described above.

The cavity resonator 131 in Comparative Example 4 has a coaxial harmonic cavity resonator structure (rd/rc=0.47).

In the radial direction of the cavity resonator 131, an electric field correction section 170 protrudes from a nose section 137, and a space of a gap section 138 is reduced to increase the electric field intensity distribution, thereby generating an electric field intensity distribution that is axisymmetric with respect to an electron beam axis.

In a case where the ratio (rd/rc) of the diameter of the drift tube 132 to a cutoff diameter in TE11 mode at the resonant frequency of the cavity resonance exceeds approximately 0.35 times, preferably 0.4 times, since the cavity resonator voltage drops significantly at both ends of the drift tube 132 in the radial direction, the effect of improving the quality of the cluster of electrons is insufficient only by making the electric field intensity at the center of the gap section 138 about the same level as in Comparative Example 4. Note that, as an example in which the ratio of the diameter of the drift tube 132 to the cutoff diameter exceeds 0.35 times, preferably 0.4 times, there are cases in which a multi-beam klystron in an S-band or higher band uses a harmonic cavity resonator or a cavity resonator of a multi-beam klystron in an X-band or higher band is applied.

As shown in FIG. 36, in Comparative Example 4, the deviation of the cavity resonator voltage between the circumferential side and the radial side was improved from 31% in Comparative Example 2 to 27%, but the improvement is low. In the fifth embodiment, the deviation of the cavity resonator voltage is greatly improved from 31% in Comparative Example 2 to 9%. The acceleration and deceleration of electrons can be performed at the cavity resonator voltage with this small deviation, which prevents a decrease in efficiency.

Figures 38, 39:
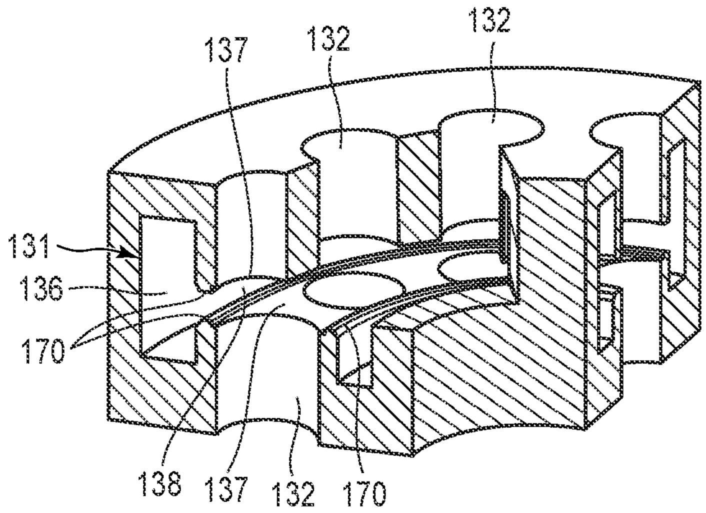
FIG. 38 is a perspective view of a part of a cavity resonator of Comparative Example 6.
FIG. 39 shows a table of normalized cavity resonator voltages considering a beam coupling coefficient for each cavity resonator voltage evaluation axis of the cavity resonators for Comparative Example 5 and Comparative Example 6.

FIG. 37 is a perspective view of a part of a cavity resonator 131 of Comparative Example 5, FIG. 38 is a perspective view of a part of a cavity resonator 131 of Comparative Example 6, and FIG. 39 shows a table of normalized cavity resonator voltages considering a beam coupling coefficient for each cavity resonator voltage evaluation axis of the cavity resonators 131 for Comparative Example 5 and Comparative Example 6. Note that the cavity resonator voltage evaluation axis in FIG. 39 is as described above.

The cavity resonator 131 of Comparative Example 5 in FIG. 37 has a structure without electric field intensity correction as in Comparative Example 2 in FIG. 30, as well as a fundamental wave cavity resonator structure (rd/rc=0.23). The cavity resonator 131 of Comparative Example 6 in FIG. 38 has a structure with an electric field correction section 170 as in Comparative Example 4 in FIG. 33, as well as a fundamental wave cavity resonator structure (rd/rc=0.23).

As in Comparative Examples 5 and 6, in a fundamental wave cavity resonator with a diameter ratio rd/rc of a drift tube 132 of approximately 0.2, the electric field intensity in the center of a gap section 138 is substantially equalized by the correction by an electric field correction section 170, and the deviation of the cavity resonator voltage between the circumference side and the diameter side becomes 6% and 5%; however, as in Comparative Example 4 where rd/rc exceeds 0.35 times, preferably 0.4 times, in a harmonic cavity resonator, even in a case where correction is performed by the electric field correction section 170, the deviation of the cavity resonator voltage between the circumferential side and the radial side becomes as large as 27%.

Therefore, as in the fifth and sixth embodiments, by correcting the non-axisymmetric cavity resonator voltage between the circumferential side and the radial side of the cavity resonator 131 and bringing it closer to the distribution of the cavity resonator voltage that is axisymmetric with respect to the electron beam axis, the energy dispersion within the cluster of electrons accelerated and decelerated by this cavity resonator voltage is reduced, reduction in operating efficiency is suppressed, and output conversion efficiency can be improved.

Moreover, in a case where the electric field intensity distribution tends to be non-axisymmetric with respect to the electron beam axis, that is, in a case where the diameter of the drift tube 132 is at least 0.35 times the cutoff diameter of the TE11 mode high frequencies at the resonant frequency of the cavity resonator 131, even in a case where the diameter of the drift tube 132 is relatively large with respect to the wavelength at the resonant frequency, the non-axisymmetric distribution of the cavity resonator voltage in the circumferential direction and the radial direction in the cavity resonator 131 can be corrected to make the cavity resonator voltage axisymmetric with respect to the electron beam axis.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A klystron device comprising: a klystron body having an electron gun section that generates an electron beam, a collector section that captures the electron beam, a plurality of cavity resonators arranged between the electron gun section and the collector section, and a plurality of drift tubes that connect the plurality of cavity resonators in an axial direction; and a focusing magnetic field device to focus the electron beam, wherein the cavity resonators have nose sections that face each other in the axial direction and form a gap section that is connected to the drift tubes, at least one of the cavity resonators has an electric field correction section in a part of the nose section that makes a space of the gap section different with respect to a space between the nose sections, and the electric field correction section protrudes from the nose section in a radial direction of the cavity resonator and reduces the space of the gap section, is recessed from the nose section in a circumferential direction of the cavity resonator and increases the space of the gap section, or protrudes from the nose section in the radial direction of the cavity resonator to reduce the space of the gap section, and is recessed from the nose section in the circumferential direction of the cavity resonator to increase the space of the gap section.

2. The klystron device of claim 1, wherein the electric field correction section is provided at a location away from the drift tubes in the nose section.

3. The klystron device of claim 1, wherein the cavity resonator is a coaxial TM010 mode and the plurality of drift tubes are located on a circumference concentric with the cavity resonator.

4. The klystron device of claim 3, wherein a diameter of the drift tubes is at least 0.2 times a cutoff diameter of a TE11 mode at a resonant frequency of the cavity resonator.

5. A klystron device comprising: a klystron body having an electron gun section that generates an electron beam, a collector section that captures the electron beam, a plurality of cavity resonators arranged between the electron gun section and the collector section, and a plurality of drift tubes that connect the plurality of cavity resonators in an axial direction; and a focusing magnetic field device to focus the electron beam, wherein the cavity resonators have nose sections that face each other in the axial direction and form a gap section that is connected to the drift tubes, and at least one of the cavity resonators has a cavity resonator voltage correction section that is provided at a position of the nose section corresponding to a circumferential direction of the cavity resonator and that increases a space of the gap section.

6. The klystron device of claim 5, wherein the cavity resonator voltage correction section makes the space of the gap section largest at a position in a circumferential direction passing through a center of the drift tubes, and makes the space of the gap section smaller at a position on a center side and outer side of the cavity resonator in a radial direction than a position in the circumferential direction passing through the center of the drift tubes.

7. The klystron device of claim 6, wherein the cavity resonator voltage correction section changes the space of the gap section in steps.

8. The klystron device of claim 7, wherein the cavity resonator is a coaxial TM010 mode, and the plurality of drift tubes are located on a circumference concentric with the cavity resonator.

9. The klystron device of claim 8, wherein a diameter of the drift tubes is at least 0.35 times a cutoff diameter of a TE11 mode at a resonant frequency of the cavity resonator.

10. The klystron device of claim 5, wherein the cavity resonator is a coaxial TM010 mode and the plurality of drift tubes are located on a circumference concentric with the cavity resonator.

11. The klystron device of claim 10, wherein a diameter of the drift tubes is at least 0.35 times a cutoff diameter of a TE11 mode at a resonant frequency of the cavity resonator.

* * * * *